US012762517B2

(12) United States Patent
Bowles et al.

(10) Patent No.: US 12,762,517 B2
(45) Date of Patent: *Oct. 13, 2026

(54) SYSTEMS AND METHODS FOR RECYCLING CONSUMER ELECTRONIC DEVICES

(71) Applicant: ecoATM, LLC, San Diego, CA (US)

(72) Inventors: Mark Vincent Bowles, San Diego, CA (US); Michael Librizzi, San Diego, CA (US); Jeffrey Ploetner, San Diego, CA (US); John Andrew Beane, San Diego, CA (US); Eric Rosser, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/953,695

(22) Filed: Nov. 20, 2024

(65) Prior Publication Data

US 2025/0225487 A1 Jul. 10, 2025

Related U.S. Application Data

(60) Continuation-in-part of application No. 18/658,157, filed on May 8, 2024, now abandoned, and a
(Continued)

(51) Int. Cl.
*G06Q 10/30* (2023.01)
*G06Q 20/18* (2012.01)
(Continued)

(52) U.S. Cl.
CPC ............ *G06Q 10/30* (2013.01); *G06Q 20/18* (2013.01); *G06Q 30/018* (2013.01);
(Continued)

(58) Field of Classification Search
None
See application file for complete search history.

(56) References Cited

U.S. PATENT DOCUMENTS 1,327,315 A 1/1920 Davies
1,730,015 A 10/1929 Rooke
(Continued)

FOREIGN PATENT DOCUMENTS

CA 2760863 11/2010
CA 3039716 9/2011
(Continued)

OTHER PUBLICATIONS

2006 Florida Statutes Title XXXIII, Chapter 538, Sections 538.03 and 538.04, 7 pages.
(Continued)

*Primary Examiner* — Asfand M Sheikh
(74) *Attorney, Agent, or Firm* — Ashurst Perkins Coie US LLP

(57) ABSTRACT

Systems and associated methods for recycling and performing other processes with consumer electronic devices are described herein. In various embodiments, the present technology includes systems and methods for identifying and evaluating an electronic device to facilitate processing (e.g., purchasing) the device. In some embodiments, the present technology includes a self-service evaluation apparatus and a cashier terminal that identifies and evaluates a device and that facilitates purchase and recycling of the device. Various other aspects of the present technology are described herein.

18 Claims, 6 Drawing Sheets

Related U.S. Application Data continuation-in-part of application No. 17/817,296, filed on Aug. 3, 2022, now Pat. No. 12,205,081, said application No. 18/658,157 is a continuation of application No. 17/655,217, filed on Mar. 17, 2022, now Pat. No. 12,008,520, and a continuation-in-part of application No. 17/393,168, filed on Aug. 3, 2021, now Pat. No. 12,541,745, and a continuation-in-part of application No. 17/086,357, filed on Oct. 31, 2020, said application No. 17/655,217 is a continuation of application No. 16/601,492, filed on Oct. 14, 2019, now Pat. No. 11,315,093, said application No. 17/817,296 is a continuation of application No. 16/556,104, filed on Aug. 29, 2019, now Pat. No. 11,436,570, said application No. 17/393,168 is a continuation of application No. 14/967,183, filed on Dec. 11, 2015, now abandoned, said application No. 16/601,492 is a continuation of application No. 14/966,346, filed on Dec. 11, 2015, now Pat. No. 11,080,672, said application No. 17/086,357 is a division of application No. 14/934,134, filed on Nov. 5, 2015, now Pat. No. 10,860,990, said application No. 16/556,104 is a continuation of application No. 14/925,357, filed on Oct. 28, 2015, now Pat. No. 10,417,615.

(60) Provisional application No. 62/091,426, filed on Dec. 12, 2014, provisional application No. 62/076,437, filed on Nov. 6, 2014, provisional application No. 62/073,840, filed on Oct. 31, 2014.

(51) Int. Cl.

| | |
|---|---|
| ***G06Q 30/018*** | (2023.01) |
| ***G06Q 30/0208*** | (2023.01) |
| ***G06Q 30/0283*** | (2023.01) |
| ***G07F 7/06*** | (2006.01) |

(52) U.S. Cl.

CPC ..... *G06Q 30/0208* (2013.01); *G06Q 30/0283* (2013.01); *G07F 7/06* (2013.01); *Y02W 30/82* (2015.05); *Y02W 90/00* (2015.05)

(56) References Cited

U.S. PATENT DOCUMENTS

| | | | |
|---|---|---|---|
| 2,817,725 | A | 12/1957 | Rochfort |
| 3,808,439 | A | 4/1974 | Renius |
| 4,248,334 | A | 2/1981 | Hanley et al. |
| 4,272,757 | A | 6/1981 | McLaughlin et al. |
| 4,519,522 | A | 5/1985 | McElwee |
| 4,593,820 | A | 6/1986 | Antonie |
| 4,715,709 | A | 12/1987 | Sekine et al. |
| 4,821,118 | A | 4/1989 | Lafreniere |
| 4,845,636 | A | 7/1989 | Walker |
| 4,870,357 | A | 9/1989 | Young et al. |
| 4,878,736 | A | 11/1989 | Hekker et al. |
| 4,893,789 | A | 1/1990 | Novorsky |
| 4,927,051 | A | 5/1990 | Falk et al. |
| 4,951,308 | A | 8/1990 | Bishop et al. |
| 5,025,344 | A | 6/1991 | Maly et al. |
| 5,027,074 | A | 6/1991 | Haferstat |
| 5,077,462 | A | 12/1991 | Newell et al. |
| 5,091,773 | A | 2/1992 | Fouche et al. |
| 5,105,149 | A | 4/1992 | Tokura |
| 5,159,560 | A | 10/1992 | Newell et al. |
| 5,216,502 | A | 6/1993 | Katz |
| 5,280,170 | A | 1/1994 | Baldwin |
| 5,319,459 | A | 6/1994 | Mochizuki et al. |
| 5,339,096 | A | 8/1994 | Beaufort et al. |
| 5,413,454 | A | 5/1995 | Movesian |
| 5,419,438 | A | 5/1995 | Squyres et al. |
| 5,436,554 | A | 7/1995 | Decker |
| 5,482,140 | A | 1/1996 | Moore |
| 5,533,645 | A | 7/1996 | Wittern |
| 5,570,920 | A | 11/1996 | Crisman et al. |
| 5,572,444 | A | 11/1996 | Lentz et al. |
| 5,610,710 | A | 3/1997 | Canfield et al. |
| 5,711,530 | A | 1/1998 | Lewis |
| 5,717,780 | A | 2/1998 | Mitsumune et al. |
| 5,747,784 | A | 5/1998 | Walter et al. |
| 5,748,084 | A | 5/1998 | Isikoff |
| 5,775,806 | A | 7/1998 | Allred |
| 5,839,058 | A | 11/1998 | Phillips et al. |
| 5,871,371 | A | 2/1999 | Rothenberger et al. |
| 5,920,338 | A | 7/1999 | Katz |
| 5,937,396 | A | 8/1999 | Konya |
| 5,949,901 | A | 9/1999 | Nichani et al. |
| 5,965,858 | A | 10/1999 | Suzuki et al. |
| 5,966,654 | A | 10/1999 | Croughwell et al. |
| 5,987,159 | A | 11/1999 | Nichani |
| 5,988,431 | A | 11/1999 | Roe |
| 5,988,971 | A | 11/1999 | Fossey et al. |
| 6,029,851 | A | 2/2000 | Jenkins et al. |
| 6,041,229 | A | 3/2000 | Turner |
| 6,055,512 | A | 4/2000 | Dean et al. |
| 6,100,986 | A | 8/2000 | Rydningen |
| 6,170,702 | B1 | 1/2001 | Zettler et al. |
| 6,181,805 | B1 | 1/2001 | Koike et al. |
| 6,216,890 | B1 | 4/2001 | Rathmer |
| 6,228,008 | B1 | 5/2001 | Pollington et al. |
| 6,234,812 | B1 | 5/2001 | Ivers et al. |
| 6,259,827 | B1 | 7/2001 | Nichani |
| 6,264,104 | B1 | 7/2001 | Jenkins et al. |
| 6,283,475 | B1 | 9/2001 | Stubben |
| 6,323,782 | B1 | 11/2001 | Stephens et al. |
| 6,330,354 | B1 | 12/2001 | Companion et al. |
| 6,330,958 | B1 | 12/2001 | Ruskin et al. |
| 6,393,095 | B1 | 5/2002 | Robinson |
| 6,412,654 | B1 | 7/2002 | Cleeve |
| 6,462,644 | B1 | 10/2002 | Howell et al. |
| 6,529,837 | B1 | 3/2003 | Kang |
| 6,535,637 | B1 | 3/2003 | Wootton et al. |
| 6,573,886 | B1 | 6/2003 | Lehtinen et al. |
| 6,575,363 | B1 | 6/2003 | Leason et al. |
| 6,587,581 | B1 | 7/2003 | Matsuyama et al. |
| 6,595,684 | B1 | 7/2003 | Casagrande et al. |
| 6,597,552 | B1 | 7/2003 | Griepentrog et al. |
| 6,606,154 | B1 | 8/2003 | Oda |
| 6,633,377 | B1 | 10/2003 | Weiss et al. |
| 6,667,800 | B1 | 12/2003 | Larsson et al. |
| 6,679,499 | B2 | 1/2004 | Jeon |
| 6,687,679 | B1 | 2/2004 | Van Luchene |
| 6,741,731 | B1 | 5/2004 | Yamamoto et al. |
| 6,748,296 | B2 | 6/2004 | Banerjee et al. |
| 6,754,637 | B1 | 6/2004 | Stenz |
| 6,758,370 | B2 | 7/2004 | Cooke et al. |
| 6,758,394 | B2 | 7/2004 | Maskatiya et al. |
| 6,795,201 | B2 | 9/2004 | Rangarajan et al. |
| 6,798,528 | B1 | 9/2004 | Hartman |
| 6,822,422 | B2 | 11/2004 | Sagawa |
| 6,842,596 | B2 | 1/2005 | Morii et al. |
| 6,847,393 | B2 | 1/2005 | Ashe |
| 6,854,656 | B2 | 2/2005 | Matsumori |
| 6,874,932 | B2 | 4/2005 | Devitt et al. |
| 6,882,269 | B2 | 4/2005 | Moreno |
| 6,886,744 | B2 | 5/2005 | Ichihara et al. |
| 6,947,941 | B1 | 9/2005 | Koon |
| D512,964 | S | 12/2005 | Kissinger et al. |
| 6,983,067 | B2 | 1/2006 | Cox |
| 7,001,038 | B2 | 2/2006 | Bock et al. |
| 7,027,031 | B2 | 4/2006 | Kawasaki et al. |
| 7,039,609 | B2 | 5/2006 | Aoki |
| 7,062,454 | B1 | 6/2006 | Giannini et al. |
| 7,066,767 | B2 | 6/2006 | Liao |
| 7,069,236 | B1 | 6/2006 | Tsunenari |
| 7,076,449 | B2 | 7/2006 | Tsunenari et al. |
| 7,086,592 | B2 | 8/2006 | Wagner et al. |
| 7,109,293 | B2 | 9/2006 | Hwang et al. |
| 7,142,335 | B2 | 11/2006 | Tesavis |

(56) References Cited

U.S. PATENT DOCUMENTS

| | | | |
|---|---|---|---|
| 7,153,086 | B2 | 12/2006 | Kauppila et al. |
| 7,158,170 | B2 | 1/2007 | Gustavsson |
| 7,164,518 | B2 | 1/2007 | Yang |
| 7,166,856 | B2 | 1/2007 | Cho et al. |
| 7,178,720 | B1 | 2/2007 | Strubbe et al. |
| 7,200,497 | B2 | 4/2007 | Wang et al. |
| 7,201,125 | B2 | 4/2007 | Evans |
| 7,205,529 | B2 | 4/2007 | Andersen et al. |
| 7,213,754 | B2 | 5/2007 | Eglen et al. |
| 7,213,766 | B2 | 5/2007 | Ryan et al. |
| 7,234,609 | B2 | 6/2007 | DeLazzer et al. |
| 7,251,458 | B2 | 7/2007 | O'Connell |
| 7,268,345 | B2 | 9/2007 | Schultz |
| 7,334,729 | B2 | 2/2008 | Brewington |
| 7,343,319 | B1 | 3/2008 | Jen |
| 7,348,884 | B2 | 3/2008 | Higham |
| 7,388,977 | B2 | 6/2008 | Wang et al. |
| 7,398,921 | B2 | 7/2008 | Zito, Jr. |
| 7,407,392 | B1 | 8/2008 | Cooke et al. |
| 7,408,674 | B2 | 8/2008 | Moro et al. |
| 7,431,158 | B2 | 10/2008 | Yamada et al. |
| 7,455,226 | B1 | 11/2008 | Hammond et al. |
| 7,520,666 | B2 | 4/2009 | Pevzner et al. |
| 7,529,687 | B1 | 5/2009 | Phan |
| 7,567,344 | B2 | 7/2009 | LeBlanc et al. |
| 7,577,496 | B2 | 8/2009 | Walker et al. |
| 7,584,269 | B2 | 9/2009 | Moore et al. |
| 7,588,165 | B2 | 9/2009 | Prichard et al. |
| 7,635,131 | B2 | 12/2009 | Fukazawa |
| 7,642,687 | B2 | 1/2010 | Kageyama et al. |
| 7,646,193 | B2 | 1/2010 | Suzuki et al. |
| 7,649,450 | B2 | 1/2010 | Campion et al. |
| 7,702,108 | B2 | 4/2010 | Amon et al. |
| 7,735,125 | B1 | 6/2010 | Alvarez et al. |
| 7,761,331 | B2 | 7/2010 | Low et al. |
| 7,783,379 | B2 | 8/2010 | Beane et al. |
| 7,848,833 | B2 | 12/2010 | Li |
| 7,881,965 | B2 | 2/2011 | Bowles et al. |
| 7,890,373 | B2 | 2/2011 | Junger |
| D640,199 | S | 6/2011 | Wilson |
| 8,010,402 | B1 | 8/2011 | Sharma et al. |
| 8,019,588 | B1 | 9/2011 | Wohlberg et al. |
| 8,025,229 | B2 | 9/2011 | Hammond et al. |
| 8,031,930 | B2 | 10/2011 | Wang et al. |
| 8,107,243 | B2 | 1/2012 | Guccione et al. |
| 8,112,325 | B2 | 2/2012 | Foy et al. |
| 8,142,199 | B1 | 3/2012 | Almouli |
| 8,156,008 | B2 | 4/2012 | Bae et al. |
| 8,195,511 | B2 | 6/2012 | Bowles et al. |
| 8,200,533 | B2 | 6/2012 | Librizzi et al. |
| 8,200,736 | B2 | 6/2012 | Shi |
| 8,215,546 | B2 | 7/2012 | Lin et al. |
| 8,234,185 | B2 | 7/2012 | Davis |
| 8,239,262 | B2 | 8/2012 | Bowles et al. |
| 8,254,883 | B2 | 8/2012 | Uchida |
| 8,266,008 | B1 | 9/2012 | Siegel et al. |
| 8,340,815 | B2 | 12/2012 | Peters et al. |
| 8,369,987 | B2 | 2/2013 | Claessen |
| 8,401,914 | B1 | 3/2013 | Kim |
| 8,417,234 | B2 | 4/2013 | Sanding et al. |
| 8,418,226 | B2 | 4/2013 | Gardner |
| 8,423,404 | B2 | 4/2013 | Bowles et al. |
| 8,429,021 | B2 | 4/2013 | Kraft et al. |
| 8,463,646 | B2 | 6/2013 | Bowles |
| 8,482,413 | B2 | 7/2013 | Douglas |
| 8,536,472 | B2 | 9/2013 | Wu et al. |
| 8,543,358 | B2 | 9/2013 | Trabona |
| 8,566,183 | B1 | 10/2013 | Bonar et al. |
| 8,606,633 | B2 | 12/2013 | Tarbert et al. |
| 8,712,893 | B1 * | 4/2014 | Brandmaier ............ G06F 16/51 705/35 |
| 8,718,717 | B2 | 5/2014 | Vaknin et al. |
| 8,743,215 | B1 | 6/2014 | Lee |
| 8,755,783 | B2 | 6/2014 | Brahami et al. |
| 8,781,622 | B2 | 7/2014 | Mockus |
| 8,806,280 | B2 | 8/2014 | Stephenson |
| 8,823,794 | B2 | 9/2014 | Suzuki et al. |
| 8,824,136 | B1 | 9/2014 | Interian et al. |
| 8,922,643 | B2 | 12/2014 | Ji et al. |
| 9,010,627 | B1 | 4/2015 | Prasad et al. |
| 9,043,026 | B2 | 5/2015 | Lien et al. |
| 9,075,781 | B2 | 7/2015 | Matthews |
| 9,081,477 | B2 | 7/2015 | Kang |
| 9,124,056 | B1 | 9/2015 | Lewis, Jr. |
| 9,147,063 | B1 | 9/2015 | Florissi |
| 9,153,089 | B1 | 10/2015 | Hewett |
| 9,189,911 | B2 | 11/2015 | Kavli et al. |
| 9,195,979 | B2 | 11/2015 | Geller |
| 9,256,863 | B2 | 2/2016 | Chayon et al. |
| 9,283,672 | B1 | 3/2016 | Matthews |
| 9,317,989 | B2 | 4/2016 | Grow et al. |
| 9,355,515 | B2 | 5/2016 | Brahami et al. |
| 9,367,436 | B2 | 6/2016 | Matthews |
| 9,367,982 | B2 | 6/2016 | Chayun et al. |
| 9,378,606 | B2 | 6/2016 | Chayun et al. |
| 9,390,442 | B2 | 7/2016 | Lyle |
| 9,469,037 | B2 | 10/2016 | Matthews |
| 9,497,563 | B2 | 11/2016 | Hornung et al. |
| 9,549,316 | B2 | 1/2017 | Ben-Harosh et al. |
| 9,578,133 | B2 | 2/2017 | Matthews |
| 9,582,101 | B2 | 2/2017 | Chang et al. |
| 9,595,238 | B2 | 3/2017 | Won |
| 9,621,947 | B1 | 4/2017 | Oztaskent |
| 9,641,997 | B2 | 5/2017 | Vratskides |
| 9,668,298 | B1 | 5/2017 | Pearl et al. |
| 9,697,548 | B1 | 7/2017 | Jaff et al. |
| 9,704,142 | B2 | 7/2017 | Ahn |
| 9,718,196 | B2 | 8/2017 | Matthews |
| 9,792,597 | B1 | 10/2017 | Abbott |
| 9,818,160 | B2 | 11/2017 | Bowles et al. |
| 9,858,178 | B2 | 1/2018 | Matthews |
| 9,866,664 | B2 | 1/2018 | Sinha et al. |
| 9,881,284 | B2 | 1/2018 | Bowles et al. |
| 9,904,911 | B2 | 2/2018 | Bowles et al. |
| 9,911,102 | B2 | 3/2018 | Bowles |
| 9,934,644 | B2 | 4/2018 | Chayun et al. |
| 9,972,046 | B2 | 5/2018 | Ackerman |
| 10,032,140 | B2 | 7/2018 | Bowles et al. |
| 10,043,339 | B2 | 8/2018 | Walker et al. |
| 10,044,843 | B2 | 8/2018 | Sinha et al. |
| 10,055,798 | B2 | 8/2018 | Bowles et al. |
| 10,157,379 | B2 | 12/2018 | Singh |
| 10,157,427 | B2 | 12/2018 | Bowles et al. |
| 10,261,611 | B2 | 4/2019 | Matthews |
| 10,275,813 | B2 | 4/2019 | Fu |
| 10,339,509 | B2 | 7/2019 | Bordeleau et al. |
| 10,401,411 | B2 | 9/2019 | Snook et al. |
| 10,417,615 | B2 | 9/2019 | Bowles et al. |
| 10,438,174 | B2 | 10/2019 | Bowles et al. |
| 10,445,708 | B2 | 10/2019 | Hunt et al. |
| 10,452,527 | B2 | 10/2019 | Matthews |
| 10,475,002 | B2 | 11/2019 | Silva et al. |
| 10,496,963 | B2 | 12/2019 | Silva et al. |
| 10,565,629 | B2 | 2/2020 | Hartman |
| 10,572,946 | B2 | 2/2020 | Bowles et al. |
| 10,600,095 | B2 | 3/2020 | Ackerman |
| 10,671,367 | B2 | 6/2020 | Matthews |
| 10,679,279 | B2 | 6/2020 | Ward |
| 10,803,527 | B1 | 10/2020 | Zankat et al. |
| 10,825,082 | B2 | 11/2020 | Librizzi et al. |
| 10,846,672 | B2 | 11/2020 | Dion et al. |
| 10,853,873 | B2 | 12/2020 | Bowles et al. |
| 10,860,122 | B2 | 12/2020 | Matthews |
| 10,860,990 | B2 | 12/2020 | Bowles et al. |
| 10,977,700 | B2 | 4/2021 | Bordeleau et al. |
| 11,010,841 | B2 | 5/2021 | Bowles et al. |
| 11,014,093 | B1 | 5/2021 | Drexler |
| 11,079,753 | B1 | 8/2021 | Roy |
| 11,080,662 | B2 | 8/2021 | Bowles et al. |
| 11,080,672 | B2 | 8/2021 | Bowles |
| 11,107,046 | B2 | 8/2021 | Bowles |
| 11,122,034 | B2 | 9/2021 | Cicchitto |
| 11,126,973 | B2 | 9/2021 | Silva et al. |
| 11,232,412 | B2 | 1/2022 | Hunt et al. |

(56) References Cited

U.S. PATENT DOCUMENTS

| | | | |
|---|---|---|---|
| 11,315,093 | B2 | 4/2022 | Bowles |
| 11,436,570 | B2 | 9/2022 | Bowles et al. |
| 11,443,289 | B2 | 9/2022 | Bowles et al. |
| 11,481,754 | B2 | 10/2022 | Priebatsch |
| 11,526,932 | B2 | 12/2022 | Bowles et al. |
| 11,687,900 | B2 | 6/2023 | Dion et al. |
| 11,734,654 | B2 | 8/2023 | Silva et al. |
| 11,790,327 | B2 | 10/2023 | Bowles et al. |
| 11,790,328 | B2 | 10/2023 | Forutanpour et al. |
| 11,907,915 | B2 | 2/2024 | Bowles et al. |
| 11,935,138 | B2 | 3/2024 | Bowles et al. |
| 11,989,701 | B2 | 5/2024 | Hunt et al. |
| 12,008,520 | B2 | 6/2024 | Bowles |
| 12,182,773 | B2 | 12/2024 | Bowles |
| 12,198,108 | B2 | 1/2025 | Bowles |
| 12,205,081 | B2 | 1/2025 | Bowles et al. |
| 12,217,221 | B2 | 2/2025 | Silva et al. |
| 12,271,929 | B2 | 4/2025 | Forutanpour et al. |
| 12,300,059 | B2 | 5/2025 | Forutanpour et al. |
| 12,321,965 | B2 | 6/2025 | Forutanpour et al. |
| 12,322,259 | B2 | 6/2025 | Forutanpour et al. |
| 2001/0025883 | A1 | 10/2001 | Ichihara et al. |
| 2001/0035425 | A1 | 11/2001 | Rocco et al. |
| 2001/0039531 | A1 | 11/2001 | Aoki |
| 2002/0014577 | A1 | 2/2002 | Ulrich et al. |
| 2002/0035515 | A1 | 3/2002 | Moreno |
| 2002/0046122 | A1 | 4/2002 | Barber |
| 2002/0067184 | A1 | 6/2002 | Smith et al. |
| 2002/0087413 | A1 | 7/2002 | Mahaffy et al. |
| 2002/0112177 | A1 | 8/2002 | Voltmer |
| 2002/0129170 | A1 | 9/2002 | Moore et al. |
| 2002/0147656 | A1 | 10/2002 | Tam |
| 2002/0157033 | A1 | 10/2002 | Cox |
| 2002/0162966 | A1 | 11/2002 | Yoder |
| 2002/0186878 | A1 | 12/2002 | Hoon et al. |
| 2003/0006277 | A1 | 1/2003 | Maskatiya et al. |
| 2003/0018897 | A1 | 1/2003 | Bellis, Jr. et al. |
| 2003/0025476 | A1 | 2/2003 | Trela |
| 2003/0036866 | A1 | 2/2003 | Nair et al. |
| 2003/0061150 | A1 | 3/2003 | Kocher et al. |
| 2003/0063527 | A1 | 4/2003 | Ostwald |
| 2003/0083983 | A1 | 5/2003 | Fisher |
| 2003/0100707 | A1 | 5/2003 | Hwang et al. |
| 2003/0146898 | A1 | 8/2003 | Kawasaki et al. |
| 2003/0158789 | A1 | 8/2003 | Miura et al. |
| 2003/0170529 | A1 | 9/2003 | Sagawa |
| 2003/0179371 | A1 | 9/2003 | Rangarajan et al. |
| 2003/0191675 | A1 | 10/2003 | Murashita |
| 2003/0197782 | A1 | 10/2003 | Ashe |
| 2003/0204289 | A1 | 10/2003 | Banerjee et al. |
| 2004/0012825 | A1 | 1/2004 | Tesavis |
| 2004/0039639 | A1 | 2/2004 | Walker |
| 2004/0088231 | A1 | 5/2004 | Davis |
| 2004/0114153 | A1 | 6/2004 | Andersen et al. |
| 2004/0141320 | A1 | 7/2004 | Bock et al. |
| 2004/0150815 | A1 | 8/2004 | Sones et al. |
| 2004/0156557 | A1 | 8/2004 | Van Der Weij |
| 2004/0184651 | A1 | 9/2004 | Nordbryhn |
| 2004/0186744 | A1 | 9/2004 | Lux |
| 2004/0189812 | A1 | 9/2004 | Gustavsson |
| 2004/0200902 | A1 | 10/2004 | Ishioroshi |
| 2004/0205015 | A1 | 10/2004 | DeLaCruz |
| 2004/0235513 | A1 | 11/2004 | O'Connell |
| 2004/0242216 | A1 | 12/2004 | Boutsikakis |
| 2004/0243478 | A1 | 12/2004 | Walker et al. |
| 2004/0262521 | A1 | 12/2004 | Devitt et al. |
| 2005/0022699 | A1 | 2/2005 | Goza |
| 2005/0027622 | A1 | 2/2005 | Walker et al. |
| 2005/0035311 | A1 | 2/2005 | Asakawa et al. |
| 2005/0043897 | A1 | 2/2005 | Meyer |
| 2005/0088379 | A1 | 4/2005 | Tsuchida |
| 2005/0109841 | A1 | 5/2005 | Ryan et al. |
| 2005/0128551 | A1 | 6/2005 | Yang |
| 2005/0135917 | A1 | 6/2005 | Kauppila et al. |
| 2005/0137942 | A1 | 6/2005 | LaFluer |
| 2005/0139661 | A1 | 6/2005 | Eglen et al. |
| 2005/0143149 | A1 | 6/2005 | Becker et al. |
| 2005/0167620 | A1 | 8/2005 | Cho et al. |
| 2005/0187657 | A1 | 8/2005 | Hashimoto et al. |
| 2005/0216120 | A1 | 9/2005 | Rosenberg et al. |
| 2005/0222690 | A1 | 10/2005 | Wang et al. |
| 2005/0231595 | A1 | 10/2005 | Wang et al. |
| 2005/0240958 | A1 | 10/2005 | Nguyen et al. |
| 2006/0022827 | A1 | 2/2006 | Highham |
| 2006/0038114 | A9 | 2/2006 | Cofer et al. |
| 2006/0047573 | A1 | 3/2006 | Mitchell et al. |
| 2006/0074756 | A1 | 4/2006 | Boykin |
| 2006/0085158 | A1 | 4/2006 | Cakiner |
| 2006/0129411 | A1 | 6/2006 | Bhatti et al. |
| 2006/0167580 | A1 | 7/2006 | Whittier |
| 2006/0184379 | A1 | 8/2006 | Tan et al. |
| 2006/0195384 | A1 | 8/2006 | Bauer et al. |
| 2006/0215027 | A1 | 9/2006 | Nonoyama et al. |
| 2006/0217152 | A1 | 9/2006 | Fok et al. |
| 2006/0219776 | A1 | 10/2006 | Finn |
| 2006/0229108 | A1 | 10/2006 | Cehelnik |
| 2006/0230013 | A1 | 10/2006 | Hrle |
| 2006/0235747 | A1 | 10/2006 | Hammond et al. |
| 2006/0255940 | A1 | 11/2006 | White et al. |
| 2006/0258008 | A1 | 11/2006 | Holler et al. |
| 2006/0261931 | A1 | 11/2006 | Cheng et al. |
| 2006/0271431 | A1 | 11/2006 | Wehr et al. |
| 2006/0279307 | A1 | 12/2006 | Wang et al. |
| 2006/0280356 | A1 | 12/2006 | Yamagashi |
| 2006/0287929 | A1 | 12/2006 | Bae et al. |
| 2007/0012665 | A1 | 1/2007 | Nelson |
| 2007/0013124 | A1 | 1/2007 | Graef et al. |
| 2007/0013139 | A1 | 1/2007 | Kumagai |
| 2007/0032098 | A1 | 2/2007 | Bowles et al. |
| 2007/0050083 | A1 | 3/2007 | Signorelli |
| 2007/0057815 | A1 | 3/2007 | Foy et al. |
| 2007/0129906 | A1 | 6/2007 | Stoecker et al. |
| 2007/0133844 | A1 | 6/2007 | Waehner et al. |
| 2007/0140310 | A1 | 6/2007 | Rolton et al. |
| 2007/0150403 | A1 | 6/2007 | Mock et al. |
| 2007/0205751 | A1 | 9/2007 | Suzuki et al. |
| 2007/0258085 | A1 | 11/2007 | Robbins |
| 2007/0263099 | A1 | 11/2007 | Motta et al. |
| 2007/0269099 | A1 | 11/2007 | Nishino et al. |
| 2007/0271194 | A1 | 11/2007 | Walker |
| 2007/0276911 | A1 | 11/2007 | Bhumkar |
| 2007/0281734 | A1 | 12/2007 | Mizrachi |
| 2007/0282999 | A1 | 12/2007 | Tu et al. |
| 2008/0004828 | A1 | 1/2008 | Mizrachi |
| 2008/0027581 | A1 | 1/2008 | Saether et al. |
| 2008/0033596 | A1 | 2/2008 | Fausak et al. |
| 2008/0071627 | A1 | 3/2008 | Junger |
| 2008/0088833 | A1 | 4/2008 | Yokota et al. |
| 2008/0097770 | A1 | 4/2008 | Low et al. |
| 2008/0109746 | A1 | 5/2008 | Mayer |
| 2008/0111989 | A1 | 5/2008 | Dufour et al. |
| 2008/0133432 | A1 | 6/2008 | Ramseyer |
| 2008/0149720 | A1 | 6/2008 | Colville |
| 2008/0167578 | A1 | 7/2008 | Bryer et al. |
| 2008/0177598 | A1 | 7/2008 | Davie |
| 2008/0207198 | A1 | 8/2008 | Juric |
| 2008/0228582 | A1 | 9/2008 | Fordyce |
| 2008/0228629 | A1 | 9/2008 | Gotthelf et al. |
| 2008/0231113 | A1 | 9/2008 | Guccione et al. |
| 2008/0255901 | A1 | 10/2008 | Carroll et al. |
| 2008/0256008 | A1 | 10/2008 | Kwok |
| 2008/0260235 | A1 | 10/2008 | Cai et al. |
| 2008/0277467 | A1 | 11/2008 | Carlson |
| 2008/0281691 | A1 | 11/2008 | Pearson et al. |
| 2008/0296374 | A1 | 12/2008 | Gonen et al. |
| 2008/0303915 | A1 | 12/2008 | Omi |
| 2008/0306701 | A1 | 12/2008 | Zhong et al. |
| 2009/0051907 | A1 | 2/2009 | Li et al. |
| 2009/0078775 | A1 | 3/2009 | Giebel et al. |
| 2009/0079388 | A1 | 3/2009 | Reddy |
| 2009/0095047 | A1 | 4/2009 | Patel et al. |
| 2009/0108015 | A1 | 4/2009 | Kreamer |
| 2009/0114716 | A1 | 5/2009 | Ramachandran |
| 2009/0132813 | A1 | 5/2009 | Schibuk |

(56) References Cited

U.S. PATENT DOCUMENTS

2009/0145727 A1 6/2009 Johns
2009/0156199 A1 6/2009 Steenstra et al.
2009/0160668 A1 6/2009 Crowley et al.
2009/0177319 A1 7/2009 Garibaldi et al.
2009/0184865 A1 7/2009 Valo et al.
2009/0187491 A1 7/2009 Bull et al.
2009/0190142 A1 7/2009 Taylor et al.
2009/0191931 A1 7/2009 Peck
2009/0207743 A1 8/2009 Huq et al.
2009/0244285 A1 10/2009 Chathukutty et al.
2009/0247133 A1 10/2009 Holmen et al.
2009/0248883 A1 10/2009 Suryanarayana et al.
2009/0251815 A1 10/2009 Wang et al.
2009/0262341 A1 10/2009 Konopa et al.
2009/0265035 A1 10/2009 Jenkinson et al.
2009/0299543 A1 12/2009 Cox et al.
2009/0312009 A1 12/2009 Fishel
2009/0321511 A1 12/2009 Browne
2009/0322706 A1 12/2009 Austin
2010/0005004 A1 1/2010 Hudak et al.
2010/0051695 A1 3/2010 Yepez et al.
2010/0063894 A1 3/2010 Lundy
2010/0088192 A1 4/2010 Bowles et al.
2010/0110174 A1 5/2010 Leconte
2010/0115887 A1 5/2010 Schroeder et al.
2010/0147953 A1 6/2010 Barkan
2010/0157280 A1 6/2010 Kusevic et al.
2010/0161397 A1 6/2010 Gauthier et al.
2010/0162359 A1 6/2010 Casey et al.
2010/0169231 A1 7/2010 Bowles et al.
2010/0174596 A1 7/2010 Gilman
2010/0185506 A1 7/2010 Wolff
2010/0219234 A1 9/2010 Forbes
2010/0228676 A1 9/2010 Librizzi et al.
2010/0235198 A1 9/2010 Fini et al.
2010/0237854 A1 9/2010 Kumhyr et al.
2010/0260271 A1 10/2010 Kapoor
2010/0262481 A1 10/2010 Baker et al.
2010/0268792 A1 10/2010 Butler
2010/0312639 A1 12/2010 Mastronardi
2011/0035322 A1 2/2011 Lively
2011/0043628 A1 2/2011 Yun
2011/0047022 A1 2/2011 Walker
2011/0050164 A1 3/2011 Partovi et al.
2011/0055322 A1 3/2011 Gregersen
2011/0060641 A1 3/2011 Grossman et al.
2011/0066514 A1 3/2011 Maraz
2011/0067520 A1 3/2011 Ihrke et al.
2011/0082734 A1 4/2011 Zhang et al.
2011/0099264 A1 4/2011 Chapin et al.
2011/0113479 A1 5/2011 Ganem
2011/0173576 A1 7/2011 Murphy et al.
2011/0191861 A1 8/2011 Spears
2011/0235853 A1 9/2011 Bowles et al.
2011/0295417 A1 12/2011 Smith, III
2011/0296339 A1 12/2011 Kang
2011/0296508 A1 12/2011 Os et al.
2011/0313840 A1 12/2011 Mason et al.
2012/0004761 A1 1/2012 Madruga
2012/0016518 A1 1/2012 Saario et al.
2012/0022965 A1 1/2012 Seergy
2012/0026582 A1 2/2012 Okabe et al.
2012/0029985 A1 2/2012 Wilson et al.
2012/0030097 A1 2/2012 Hagan et al.
2012/0030399 A1 2/2012 Ben-Harosh
2012/0054113 A1 3/2012 Jayaraman et al.
2012/0063501 A1 3/2012 Aguren
2012/0078413 A1 3/2012 Baker
2012/0095875 A1 4/2012 Guthrie
2012/0116928 A1 5/2012 Gventer
2012/0116929 A1 5/2012 Gventer
2012/0117001 A1 5/2012 Gventer et al.
2012/0127307 A1 5/2012 Hassenzahl
2012/0146956 A1 6/2012 Jenkinson
2012/0191562 A1 7/2012 Bowles et al.
2012/0209783 A1 8/2012 Smith et al.
2012/0235812 A1 9/2012 De Mello et al.
2012/0246083 A1 9/2012 Bowles
2012/0249779 A1 10/2012 Ji et al.
2012/0254046 A1 10/2012 Librizzi et al.
2012/0263394 A1 10/2012 Fujiwara et al.
2012/0280934 A1 11/2012 Ha
2012/0294490 A1 11/2012 Bowles et al.
2012/0301009 A1 11/2012 Dabic
2012/0303431 A1 11/2012 Phillips et al.
2013/0006713 A1 1/2013 Haake
2013/0034305 A1 2/2013 Jahanshahi et al.
2013/0041508 A1 2/2013 Hu et al.
2013/0046611 A1 2/2013 Bowles et al.
2013/0046699 A1 2/2013 Bowles et al.
2013/0073376 A1 3/2013 Heath
2013/0112440 A1 5/2013 Alsaif et al.
2013/0124426 A1 5/2013 Bowles et al.
2013/0126741 A1 5/2013 Srivastava et al.
2013/0137376 A1 5/2013 Fitzgerald et al.
2013/0138528 A1 5/2013 McAlhaney
2013/0144797 A1 6/2013 Bowles et al.
2013/0155061 A1 6/2013 Jahanshahi et al.
2013/0157641 A1 6/2013 Brahami et al.
2013/0159119 A1 6/2013 Henderson et al.
2013/0169413 A1 7/2013 Schuessler
2013/0173430 A1 7/2013 Benjamin
2013/0173434 A1 7/2013 Hartman
2013/0181935 A1 7/2013 McKenzie et al.
2013/0191236 A1 7/2013 Bowles
2013/0198089 A1 8/2013 Bowles
2013/0198144 A1 8/2013 Bowles
2013/0200912 A1 8/2013 Panagas
2013/0226679 A1 8/2013 Bowles
2013/0246211 A1 9/2013 Sullivan
2013/0246212 A1 9/2013 Sullivan
2013/0246285 A1 9/2013 Chayun et al.
2013/0253700 A1 9/2013 Carson et al.
2013/0275314 A1 10/2013 Bowles
2013/0284805 A1 10/2013 Kraft et al.
2013/0290146 A1 10/2013 West et al.
2013/0297388 A1 11/2013 Kyle, Jr. et al.
2014/0006451 A1 1/2014 Mullis et al.
2014/0012643 A1 1/2014 Behrisch
2014/0028449 A1 1/2014 Sigal et al.
2014/0038556 A1 2/2014 DeSousa
2014/0046748 A1 2/2014 Nagarajan
2014/0046845 A1 2/2014 Dogin et al.
2014/0052329 A1 2/2014 Amirpour
2014/0067710 A1 3/2014 Gventer et al.
2014/0080550 A1 3/2014 Ino et al.
2014/0136351 A1 5/2014 Lennon
2014/0143161 A1 5/2014 Ahn
2014/0147004 A1 5/2014 Uchida
2014/0149201 A1 5/2014 Abbott
2014/0150100 A1 5/2014 Gupta et al.
2014/0156883 A1 6/2014 Bowles
2014/0178029 A1 6/2014 Raheman et al.
2014/0214505 A1 7/2014 Shuster-Arechiga et al.
2014/0235258 A1 8/2014 Wang et al.
2014/0244315 A1 8/2014 Cahill et al.
2014/0249668 A1 9/2014 Kavli et al.
2014/0267691 A1 9/2014 Humphrey
2014/0273245 A1 9/2014 Ochranek et al.
2014/0278244 A1 9/2014 Humphrey et al.
2014/0295819 A1 10/2014 Chayun et al.
2014/0297368 A1 10/2014 Ferder
2014/0316561 A1 10/2014 Tkachenko
2014/0330685 A1 11/2014 Nazzari
2014/0346185 A1 11/2014 Chayun et al.
2014/0347473 A1 11/2014 Wolff et al.
2015/0006281 A1 1/2015 Takahashi
2015/0046343 A1 2/2015 Martini
2015/0066677 A1 3/2015 Bowles et al.
2015/0073590 A1 3/2015 Garcia
2015/0088698 A1 3/2015 Ackerman
2015/0088731 A1 3/2015 Ackerman
2015/0105901 A1 4/2015 Joshi
2015/0120485 A1 4/2015 Nash

(56) References Cited

U.S. PATENT DOCUMENTS

| | | | |
|---|---|---|---|
| 2015/0161714 | A1 | 6/2015 | Fainshtein |
| 2015/0170237 | A1 | 6/2015 | Powell |
| 2015/0177330 | A1 | 6/2015 | Morris |
| 2015/0193797 | A1 | 7/2015 | Gerrity |
| 2015/0206200 | A1 | 7/2015 | Edmondson et al. |
| 2015/0249353 | A1 | 9/2015 | Hamilton |
| 2015/0278529 | A1 | 10/2015 | Cho et al. |
| 2015/0293860 | A9 | 10/2015 | Bowles |
| 2015/0294278 | A1 | 10/2015 | Nguyen |
| 2015/0309912 | A1 | 10/2015 | Nguyen et al. |
| 2015/0317619 | A1 | 11/2015 | Curtis |
| 2015/0324761 | A1 | 11/2015 | Nguyen et al. |
| 2015/0324870 | A1 | 11/2015 | Nguyen et al. |
| 2015/0332206 | A1 | 11/2015 | Trew et al. |
| 2015/0356637 | A1 | 12/2015 | Graffia et al. |
| 2016/0019607 | A1 | 1/2016 | Burmester et al. |
| 2016/0019685 | A1 | 1/2016 | Nguyen et al. |
| 2016/0055392 | A1 | 2/2016 | Nakano |
| 2016/0078434 | A1 | 3/2016 | Huxham et al. |
| 2016/0087381 | A1 | 3/2016 | Wong et al. |
| 2016/0091549 | A1 | 3/2016 | Snook et al. |
| 2016/0092849 | A1 | 3/2016 | Cirannek et al. |
| 2016/0098688 | A1 | 4/2016 | Hunt et al. |
| 2016/0098689 | A1 | 4/2016 | Bowles et al. |
| 2016/0098690 | A1 | 4/2016 | Silva et al. |
| 2016/0125367 | A1 | 5/2016 | Bowles et al. |
| 2016/0125548 | A1 | 5/2016 | Bowles et al. |
| 2016/0125612 | A1 | 5/2016 | Seki et al. |
| 2016/0132840 | A1 | 5/2016 | Bowles et al. |
| 2016/0171456 | A1 | 6/2016 | Bowles et al. |
| 2016/0171544 | A1 | 6/2016 | Heminger et al. |
| 2016/0171575 | A1 | 6/2016 | Bowles et al. |
| 2016/0184990 | A1 | 6/2016 | Song et al. |
| 2016/0210648 | A1 | 7/2016 | Cirannek et al. |
| 2016/0253861 | A1 | 9/2016 | Seo |
| 2016/0269401 | A1 | 9/2016 | Saito et al. |
| 2016/0269895 | A1 | 9/2016 | Soini et al. |
| 2016/0275460 | A1 | 9/2016 | Ploetner et al. |
| 2016/0275518 | A1 | 9/2016 | Bowles et al. |
| 2016/0284019 | A1 | 9/2016 | Bowles et al. |
| 2016/0292710 | A1 | 10/2016 | Casselle |
| 2016/0301786 | A1 | 10/2016 | Koltsov et al. |
| 2016/0328684 | A1 | 11/2016 | Bowles et al. |
| 2016/0335616 | A1 | 11/2016 | Bordeleau et al. |
| 2016/0364939 | A1 | 12/2016 | Chayun et al. |
| 2016/0379287 | A1 | 12/2016 | Dabiri |
| 2017/0011374 | A1 | 1/2017 | McDivitt |
| 2017/0083886 | A1 | 3/2017 | Silva et al. |
| 2017/0091823 | A1 | 3/2017 | Adinarayan et al. |
| 2017/0110902 | A1 | 4/2017 | Miller |
| 2017/0115235 | A1 | 4/2017 | Ohlsson et al. |
| 2017/0123828 | A1 | 5/2017 | Ben-Harosh et al. |
| 2017/0142484 | A1 | 5/2017 | Jeon |
| 2017/0169401 | A1 | 6/2017 | Beane et al. |
| 2017/0249729 | A1 | 8/2017 | Greene et al. |
| 2017/0278191 | A1 | 9/2017 | Tassone et al. |
| 2017/0286920 | A1 | 10/2017 | Silva et al. |
| 2017/0286921 | A1 | 10/2017 | Bowles |
| 2017/0301010 | A1 | 10/2017 | Bowles et al. |
| 2017/0301035 | A1 | 10/2017 | Bowles et al. |
| 2017/0323279 | A1 | 11/2017 | Dion et al. |
| 2017/0330158 | A1 | 11/2017 | Librizzi et al. |
| 2017/0372273 | A1 | 12/2017 | Bowles et al. |
| 2018/0084094 | A1 | 3/2018 | Sinha et al. |
| 2018/0130136 | A1 | 5/2018 | Bowles et al. |
| 2018/0157246 | A1 | 6/2018 | Huang et al. |
| 2018/0247280 | A1 | 8/2018 | Bowles et al. |
| 2018/0255047 | A1 | 9/2018 | Cicchitto |
| 2018/0260794 | A1 | 9/2018 | Bowles et al. |
| 2018/0365744 | A1 | 12/2018 | Lennon |
| 2019/0066439 | A1 | 2/2019 | Pinkus |
| 2019/0287141 | A1 | 9/2019 | Bordeleau et al. |
| 2019/0325530 | A1 | 10/2019 | Bowles et al. |
| 2020/0090137 | A1 | 3/2020 | Bowles et al. |
| 2020/0126046 | A1 | 4/2020 | Bowles |
| 2020/0151677 | A1 | 5/2020 | Bowles et al. |
| 2020/0151678 | A1 | 5/2020 | Silva et al. |
| 2020/0151679 | A1 | 5/2020 | Hunt et al. |
| 2020/0286030 | A1 | 9/2020 | Hewett |
| 2020/0342442 | A1 | 10/2020 | Curtis |
| 2021/0012315 | A1 | 1/2021 | Priebatsch |
| 2021/0035206 | A1 | 2/2021 | Bowles et al. |
| 2021/0081914 | A1 | 3/2021 | Nelms et al. |
| 2021/0174312 | A1 | 6/2021 | Bowles et al. |
| 2021/0224867 | A1 | 7/2021 | Bordeleau et al. |
| 2021/0272073 | A1* | 9/2021 | Chen ........................ G06F 18/21 |
| 2022/0027879 | A1 | 1/2022 | Bowles et al. |
| 2022/0172178 | A1 | 6/2022 | Forutanpour et al. |
| 2022/0198407 | A1 | 6/2022 | Beane et al. |
| 2022/0284406 | A1 | 9/2022 | Hunt et al. |
| 2022/0292464 | A1 | 9/2022 | Silva et al. |
| 2022/0318774 | A1 | 10/2022 | Bowles |
| 2023/0051060 | A1 | 2/2023 | Nitu |
| 2023/0077844 | A1 | 3/2023 | Bowles et al. |
| 2023/0100849 | A1 | 3/2023 | Bowles et al. |
| 2023/0274346 | A1 | 8/2023 | Bowles et al. |
| 2023/0297973 | A1 | 9/2023 | Bowles et al. |
| 2023/0297974 | A1 | 9/2023 | Bowles et al. |
| 2023/0306384 | A1 | 9/2023 | Bowles et al. |
| 2024/0005289 | A1 | 1/2024 | Silva et al. |
| 2024/0249251 | A1 | 7/2024 | Bowles |
| 2024/0265470 | A1 | 8/2024 | Bowles et al. |
| 2024/0289753 | A1 | 8/2024 | Bowles |
| 2024/0346463 | A1 | 10/2024 | Hunt et al. |

FOREIGN PATENT DOCUMENTS

| | | | |
|---|---|---|---|
| CA | 3235982 | | 9/2011 |
| CA | 2818533 | A1 | 5/2012 |
| CA | 2866147 | | 9/2013 |
| CA | 2926097 | | 11/2020 |
| CN | 1365479 | | 8/2002 |
| CN | 1574437 | | 2/2005 |
| CN | 2708415 | | 7/2005 |
| CN | 1864088 | | 11/2006 |
| CN | 1957320 | | 5/2007 |
| CN | 2912132 | | 6/2007 |
| CN | 200965706 | | 10/2007 |
| CN | 101176124 | | 5/2008 |
| CN | 101379488 | A | 3/2009 |
| CN | 201956656 | U | 8/2011 |
| CN | 102246384 | | 11/2011 |
| CN | 102315630 | A | 1/2012 |
| CN | 102467728 | A | 5/2012 |
| CN | 202351953 | | 7/2012 |
| CN | 202353475 | U | 7/2012 |
| CN | 102654927 | | 8/2012 |
| CN | 202394296 | | 8/2012 |
| CN | 102682597 | A | 9/2012 |
| CN | 202564711 | U | 11/2012 |
| CN | 102812500 | | 12/2012 |
| CN | 202585951 | U | 12/2012 |
| CN | 202702438 | U | 1/2013 |
| CN | 202711369 | U | 1/2013 |
| CN | 102930642 | | 2/2013 |
| CN | 102976004 | | 3/2013 |
| CN | 103198562 | | 7/2013 |
| CN | 103226870 | | 7/2013 |
| CN | 203242065 | | 10/2013 |
| CN | 103440607 | | 12/2013 |
| CN | 103514641 | | 1/2014 |
| CN | 103544772 | | 1/2014 |
| CN | 203408902 | | 1/2014 |
| CN | 103662541 | | 3/2014 |
| CN | 103679147 | A | 3/2014 |
| CN | 103765455 | | 4/2014 |
| CN | 203520502 | | 4/2014 |
| CN | 103824387 | A | 5/2014 |
| CN | 203588366 | U | 5/2014 |
| CN | 103843040 | | 6/2014 |
| CN | 103954626 | | 7/2014 |
| CN | 103999053 | | 8/2014 |
| CN | 302944037 | S | 9/2014 |
| CN | 302944252 | S | 9/2014 |

(56) References Cited

FOREIGN PATENT DOCUMENTS

| | | | |
|---|---|---|---|
| CN | 302944253 | S | 9/2014 |
| CN | 303042750 | S | 12/2014 |
| CN | 205103926 | U | 3/2016 |
| CN | 105488702 | | 4/2016 |
| CN | 105513201 | | 4/2016 |
| CN | 205129815 | U | 4/2016 |
| CN | 205132514 | U | 4/2016 |
| CN | 205140067 | U | 4/2016 |
| CN | 205247436 | | 5/2016 |
| CN | 106911159 | | 6/2017 |
| CN | 105444678 | B | 3/2018 |
| CN | 208790107 | | 4/2019 |
| DE | 10031532 | | 10/2001 |
| EP | 0116970 | | 12/1991 |
| EP | 0654003 | | 5/1995 |
| EP | 1168253 | | 1/2002 |
| EP | 1270905 | | 1/2003 |
| EP | 1699020 | | 9/2006 |
| EP | 1703436 | | 9/2006 |
| EP | 2701450 | | 2/2014 |
| EP | 2810219 | | 12/2014 |
| EP | 3255753 | | 12/2017 |
| EP | 2428072 | | 1/2018 |
| ES | 2304327 | | 10/2008 |
| GB | 2167553 | | 5/1986 |
| JP | H7112801 | | 5/1995 |
| JP | H7334583 | | 12/1995 |
| JP | H11242005 | | 9/1999 |
| JP | H11334851 | | 12/1999 |
| JP | 2000121564 | | 4/2000 |
| JP | 2000171409 | A | 6/2000 |
| JP | 2000180371 | | 6/2000 |
| JP | 3123095 | | 1/2001 |
| JP | 2001312766 | | 11/2001 |
| JP | 2002019147 | | 1/2002 |
| JP | 2002183286 | | 6/2002 |
| JP | 2002259528 | | 9/2002 |
| JP | 2002302252 | | 10/2002 |
| JP | 2002324264 | | 11/2002 |
| JP | 2002358354 | | 12/2002 |
| JP | 2003016179 | | 1/2003 |
| JP | 2003139516 | | 5/2003 |
| JP | 2003230229 | | 8/2003 |
| JP | 2003242243 | | 8/2003 |
| JP | 2003264007 | | 9/2003 |
| JP | 2003267509 | | 9/2003 |
| JP | 2004021569 | | 1/2004 |
| JP | 2004191496 | | 7/2004 |
| JP | 2004226129 | | 8/2004 |
| JP | 2004226328 | | 8/2004 |
| JP | 2004239850 | | 8/2004 |
| JP | 2004288143 | | 10/2004 |
| JP | 2004303102 | | 10/2004 |
| JP | 2004341681 | | 12/2004 |
| JP | 2005063203 | | 3/2005 |
| JP | 2005122059 | | 5/2005 |
| JP | 2005308476 | | 11/2005 |
| JP | 2006127308 | | 5/2006 |
| JP | 2006195814 | | 7/2006 |
| JP | 2006203451 | | 8/2006 |
| JP | 2006227764 | | 8/2006 |
| JP | 2006260246 | | 9/2006 |
| JP | 2007141266 | | 6/2007 |
| JP | 2007155455 | | 6/2007 |
| JP | 2007179516 | | 7/2007 |
| JP | 2007265340 | | 10/2007 |
| JP | 2008045959 | | 2/2008 |
| JP | 2008059403 | | 3/2008 |
| JP | 2008522299 | | 6/2008 |
| JP | 2008293391 | | 12/2008 |
| JP | 2007086725 | | 4/2009 |
| JP | 2009175035 | | 8/2009 |
| JP | 2009245058 | | 10/2009 |
| JP | 2009250971 | | 10/2009 |
| JP | 2009290852 | | 12/2009 |
| JP | 2010177720 | | 8/2010 |
| JP | 2010276896 | | 12/2010 |
| JP | 2011518387 | | 6/2011 |
| JP | 2012032370 | | 2/2012 |
| JP | 2012504832 | | 2/2012 |
| JP | 2012058932 | | 3/2012 |
| JP | 2013033361 | | 2/2013 |
| JP | 2013037441 | | 2/2013 |
| JP | 2013531823 | | 8/2013 |
| JP | 2014513829 | | 6/2014 |
| JP | 2015505999 | | 2/2015 |
| JP | 2015513135 | | 4/2015 |
| JP | 2016504900 | | 2/2016 |
| JP | 2017040957 | | 2/2017 |
| JP | 2017093938 | | 6/2017 |
| JP | 2017201559 | | 11/2017 |
| JP | 2018520453 | | 7/2018 |
| JP | 2019513262 | | 5/2019 |
| JP | 2020526847 | | 8/2020 |
| JP | 2021530786 | | 11/2021 |
| KR | 20000064168 | | 11/2000 |
| KR | 20010074614 | | 8/2001 |
| KR | 20010097567 | | 11/2001 |
| KR | 100581234 | | 5/2006 |
| KR | 100766860 | | 10/2007 |
| KR | 20130085255 | | 7/2013 |
| KR | 101326680 | | 11/2013 |
| KR | 101329949 | | 11/2013 |
| KR | 20140037543 | | 3/2014 |
| KR | 101599251 | | 3/2016 |
| WO | 8503790 | | 8/1985 |
| WO | 2001015096 | | 3/2001 |
| WO | 2002005176 | | 1/2002 |
| WO | 221090 | | 3/2002 |
| WO | 2002025613 | | 3/2002 |
| WO | 2002039357 | | 5/2002 |
| WO | 2003012717 | | 2/2003 |
| WO | 2003014994 | | 2/2003 |
| WO | 2004021114 | | 3/2004 |
| WO | 2004114490 | | 12/2004 |
| WO | 2005008566 | | 1/2005 |
| WO | 2005054877 | | 6/2005 |
| WO | 2005101346 | | 10/2005 |
| WO | 2006021825 | | 3/2006 |
| WO | 2006058601 | | 6/2006 |
| WO | 2006080851 | | 8/2006 |
| WO | 2007066166 | | 6/2007 |
| WO | 2009089607 | | 7/2009 |
| WO | 2009128173 | | 10/2009 |
| WO | 2009128176 | | 10/2009 |
| WO | 2009129526 | | 10/2009 |
| WO | 2010040116 | | 4/2010 |
| WO | 2010128267 | | 11/2010 |
| WO | 2010128315 | | 11/2010 |
| WO | 2011115857 | A2 | 9/2011 |
| WO | 2011131016 | | 10/2011 |
| WO | 2012073126 | | 6/2012 |
| WO | 2012138679 | | 10/2012 |
| WO | 2013002748 | | 1/2013 |
| WO | 2013063042 | | 5/2013 |
| WO | 2013074819 | | 5/2013 |
| WO | 2013116256 | | 8/2013 |
| WO | 2014033350 | | 3/2014 |
| WO | 2014075055 | | 5/2014 |
| WO | 2014088978 | | 6/2014 |
| WO | 2014141180 | | 9/2014 |
| WO | 2015022409 | | 2/2015 |
| WO | 2015093676 | | 6/2015 |
| WO | 2015108864 | | 7/2015 |
| WO | 2015146026 | | 10/2015 |
| WO | 2016181224 | | 11/2016 |
| WO | 2015196175 | | 12/2016 |
| WO | 2016196175 | | 12/2016 |
| WO | 2017034441 | | 3/2017 |

(56) References Cited

FOREIGN PATENT DOCUMENTS

WO 2017081527 5/2017
WO 2018003026 1/2018

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing User's Guide 2007, 8 pages.
Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.
Brief filed Apr. 15, 2024 in U.S. Appl. No. 17/393,168, 29 pages.
Brief filed Oct. 28, 2024 in U.S. Appl. No. 17/086,357, 40 pages.
Brief filed Sep. 22, 2023 in U.S. Appl. No. 17/086,357, 39 pages.
Filed Aug. 11, 2020 in U.S. Appl. No. 14/967,183, 25 pages.
Filed Dec. 16, 2019 in U.S. Appl. No. 14/966,346, 31 pages.
Reply filed Nov. 16, 2020 in U.S. Appl. No. 14/967,183, 8 pages.
Bhule et al., "Environmental and economic trade-offs in consumer electronic products recycling: a case study of cell phones and computers," IEEE International Symposium on Electronics and the Environment, Conference Record, 2004.
Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Business Wire, "The World's First Office Photography Machine" at CES 2008 Launched by Ortery Technologies, Jan. 7, 2008, 3 pages.
CNET, "Tackling LCD "burn in", and dead/stick Pixels", published Sep. 2, 2009, retrieved from http://www.cnet.com/news/tackling-LCD-burn-ins-and-deadstuck-pixels/.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Address Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Examiner's Answer mailed Jul. 24, 2024 in U.S. Appl. No. 17/393,168, pp. all.
Examiner's Answer to Appeal Brief mailed Sep. 16, 2020 in U.S. Appl. No. 14/967,183, 7 pages.
Final Office Action mailed Aug. 14, 2023 in U.S. Appl. No. 17/393,168, 20 pages.
Final Office Action mailed Dec. 21, 2018 in U.S. Appl. No. 14/925,357, 34 pages.
Final Office Action mailed Feb. 15, 2019 in U.S. Appl. No. 14/966,346, 36 pages.
Final Office Action mailed Feb. 3, 2022 in U.S. Appl. No. 17/086,357, 20 pages.
Final Office Action mailed Jan. 29, 2020 in U.S. Appl. No. 14/934,134, 81 pages.
Final Office Action mailed Jan. 5, 2024 in U.S. Appl. No. 17/817,296, 27 pages.
Final Office Action mailed May 16, 2019 in U.S. Appl. No. 14/967,183, 25 pages.
Final Office Action mailed May 19, 2021 in U.S. Appl. No. 16/601,492, 20 pages.
Final Office Action Response dated Nov. 10, 2021 in U.S. Appl. No. 16/601,492, 20 pages.
Final Office Action response filed Apr. 22, 2019 in U.S. Appl. No. 14/925,357, 18 pages.
Final Office Action response filed Aug. 14, 2019 in U.S. Appl. No. 14/966,346, 17 pages.
Final Office Action response filed Jun. 29, 2020 in U.S. Appl. No. 14/934,134, 43 pages.
Final Office Action response filed May 26, 2022 in U.S. Appl. No. 17/086,357, 29 pages.
Final Office Action response filed Nov. 15, 2019 in U.S. Appl. No. 14/967,183, 21 pages.
Final Office response filed May 13, 2024 in U.S. Appl. No. 17/817,296, 10 pages.
Foster et al., "Automated Visual Inspection: A Tutorial" 1990 Computers Ind. Eng. vol. 18(4): 493-504.
Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recycling," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
Grose, Thomas; "New Life for Old Phones," ASE Prism 22.3 (2012): 18.
International Numbering Plan. Retrieved on Apr. 5, 2013 at <http://web.archive.org/web/20070322214125/http://www.numberingplans.com/?page+analysis&sub+imeinr>, 2 pages.
International Search Report and Written Opinion mailed Dec. 14, 2015 in International Application No. PCT/US2015/057802, 11 pages.
International Search Report and Written Opinion mailed Jan. 12, 2016 in International Application No. PCT/US2015/059351, 11 pages.
International Search Report and Written Opinion mailed Mar. 3, 2016 in International Application No. PCT/US2015/065226, 11 pages.
International Search Report and Written Opinion mailed Mar. 3, 2017 in International Application No. PCT/US2016/065801, 12 pages.
Investopedia: What's the difference between weighted average accounting and FIFO/LIFO accounting methods? Aug. 19, 2010. Accessed via archive.org [https://web.archive.org/web/20100819200402/http://www.investopedia.com/ask/answers/09/weighted-average-fifo-lifo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Kuriyan, et al.: "Review of Research on Rural PC Kiosks," Apr. 14, 2007, 22 pages, retrieved at http://research.microsoft.com/research/tem/kiosks.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
Mobilegazette.com, "2006 in Review: The Good, The Bad and The Ugly", published Dec. 2006, retrieved from http://www.mobilegazette.com/2006-review-06x12x22.htm on Nov. 11, 2015.
Nithi et al., "Smart Power Management for Mobile Handsets".
Non-Final Office Action mailed Apr. 14, 2020 in U.S. Appl. No. 14/966,346, 34 pages.
Non-Final Office Action mailed Apr. 26, 2023 in U.S. Appl. No. 17/655,217, 37 pages.
Non-Final Office Action mailed Apr. 27, 2018 in U.S. Appl. No. 14/966,346, 29 pages.
Non-Final Office Action mailed Aug. 6, 2021 in U.S. Appl. No. 17/086,357, 23 pages.
Non-Final Office Action mailed Dec. 22, 2022 in U.S. Appl. No. 17/393,168, 19 pages.

(56) References Cited

OTHER PUBLICATIONS

Non-Final Office Action mailed Jan. 10, 2020 in U.S. Appl. No. 14/967,183, 22 pages.
Non-Final Office Action mailed Jan. 29, 2024 in U.S. Appl. No. 17/086,357, 33 pages.
Non-Final Office Action mailed Jul. 26, 2018 in U.S. Appl. No. 14/925,357, 31 pages.
Non-Final Office Action mailed Jul. 27, 2018 in U.S. Appl. No. 14/967,183, 19 pages.
Non-Final Office Action mailed Jul. 8, 2019 in U.S. Appl. No. 14/934,134, 57 pages.
Non-Final Office Action mailed Jun. 22, 2021 in U.S. Appl. No. 16/556,104, 35 pages.
Non-Final Office Action mailed Mar. 30, 2023 in U.S. Appl. No. 17/817,296, 22 pages.
Non-Final Office Action mailed Oct. 6, 2022 in U.S. Appl. No. 17/086,357, 24 pages.
Non-Final Office Action mailed Sep. 17, 2020 in U.S. Appl. No. 16/601,492, 24 pages.
Non-Final Office Action response filed Dec. 21, 2021 in U.S. Appl. No. 16/556,104, 15 pages.
Non-Final Office Action response filed Dec. 5, 2021 in U.S. Appl. No. 17/086,357, 10 pages.
Non-Final Office Action response filed Feb. 11, 2021 in U.S. Appl. No. 16/601,492, 18 pages.
Non-Final Office Action response filed Jan. 28, 2019 in U.S. Appl. No. 14/967,183, 21 pages.
Non-Final Office Action response filed Jun. 22, 2023 in U.S. Appl. No. 17/393,168, 15 pages.
Non-Final Office Action response filed Nov. 21, 2018 in U.S. Appl. No. 14/925,357, 20 pages.
Non-Final Office Action response filed Nov. 8, 2019 in U.S. Appl. No. 14/934,134, 27 pages.
Non-Final Office Action response filed Oct. 26, 2018 in U.S. Appl. No. 14/966,346, 30 pages.
Non-Final Office Action response filed Sep. 14, 2020 in U.S. Appl. No. 14/966,346, 16 pages.
Non-Final Office Action response filed Sep. 29, 2023 in U.S. Appl. No. 17/817,296, 16 pages.
Non-Final Office response filed Oct. 26, 2023 in U.S. Appl. No. 17/655,217, 14 pages.
Notice of Allowance mailed Apr. 1, 2021 in U.S. Appl. No. 14/966,346, 12 pages.
Notice of Allowance mailed Aug. 3, 2020 in U.S. Appl. No. 14/934,134, 17 pages.
Notice of Allowance mailed Dec. 11, 2020 in U.S. Appl. No. 14/966,346, 12 pages.
Notice of Allowance mailed Dec. 15, 2021 in U.S. Appl. No. 16/601,492, 20 pages.
Notice of Allowance mailed Feb. 8, 2024 in U.S. Appl. No. 17/655,217, 11 pages.
Notice of Allowance mailed Jan. 28, 2022 in U.S. Appl. No. 16/556,104, 8 pages.
Notice of Allowance mailed Jun. 11, 2024 in U.S. Appl. No. 17/817,296, pp. all.
Notice of Allowance mailed May 17, 2022 in U.S. Appl. No. 16/556,104, 8 pages.
Notice of Allowance mailed May 20, 2019 in U.S. Appl. No. 14/925,357, 9 pages.
Notice of Allowance mailed Sep. 10, 2020 in U.S. Appl. No. 14/934,134, 1 pages.
Notice of Allowance mailed Sep. 18, 2024 in U.S. Appl. No. 17/814,296, pp. all.
Notice of Appeal filed Dec. 13, 2023 in U.S. Appl. No. 17/393,168, 2 pages.
Notice of Appeal filed Jun. 28, 2024 in in U.S. Appl. No. 17/086,357, pp. all.
Notice of Appeal filed Mar. 2, 2023 in U.S. Appl. No. 17/086,357, 2 pages.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk", Jun. 1997, Computer Vision and Pattern Recognition, pp. 690-696.
Reply Brief filed Sep. 24, 2024 in U.S. Appl. No. 17/393,168, pp. all.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" Pylmage Search, Sep. 2014, 19 pages.
Shi, "The LOB Recreation Model: Predicting the Limit Order Book from TAQ History Using an Ordinary Differential Equation Recurrent Neural Network" 548-556. The Thirty-Fifth AAAI Conference on Artificial Intelligence. 2021; <DOI: 10.48550/arXiv.2103.01670> abstract; p. 551, 2nd column, 1st paragraph; p. 552, 1st column, 1st paragraph; fig. 3.
Shotton et al., "Efficiently Combining Contour and Texture Cues for Object Recognition", Proceedings of the British Machine Vision Conference 2008, (Sep. 1, 2008), pp. 7.1-7.10 * abstract *.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications Ab, "P800/P802," White Paper, 2003, 128 pages.
Sony Ericsson Mobile Communications AB, "T68i/T68ie," White Paper, 2002, 71 pages.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
Tecace Software: "Your phone appraisal-Movaluate-Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Tuzun, "Usability testing of a 3D touch screen kiosk system for way-finding," Computers in Human Behavior vol. 61, Aug. 2016, pp. 73-79.
Waugh, "Phone recycling machine lets you drop in old mobiles—and spits out cash instantly," Daily Mail Online, Jan. 13, 2012, p. 1-2.

(56) References Cited

OTHER PUBLICATIONS

Wikipedia, "Machine Vision" Sep. 19, 2009, 6 pages.
Wiley Encyclopedia of Computer Science and Technology, Nov. 2008, 2362 pages, Wiley-interscience, ISBN-10: 0471383937, ISBN-13: 978-0471383932.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Belak, "Terotechnology," 2004 IEEE, pp. 201-204.
Non-Final Office Action mailed Mar. 11, 2026 in U.S. Appl. No. 17/086,357, pp. 46.
Zhou, et al. "Application of environmental accounting information to the decision-making for the environmentally conscious design and end-of-life management of cellular phones," 2006, IEEE, pp. 173-178.

* cited by examiner

SYSTEMS AND METHODS FOR RECYCLING CONSUMER ELECTRONIC DEVICES

CROSS-REFERENCE TO RELATED APPLICATIONS

This application is a Continuation-in-Part of U.S. application Ser. No. 17/817,296, filed Aug. 3, 2022; which is a Continuation of U.S. patent application Ser. No. 16/556,104, filed Aug. 29, 2019, now U.S. Pat. No. 11,436,570; which is a Continuation of U.S. patent application Ser. No. 14/925,357, filed Oct. 28, 2015, now U.S. Pat. No. 10,417,615; which claims the benefit of U.S. Provisional Application No. 62/073,840, filed Oct. 31, 2014; each of which is hereby incorporated by reference in its entirety.

This application is also a Continuation-In-Part of U.S. application Ser. No. 18/658,157, filed May 8, 2024; which is a continuation of U.S. application Ser. No. 17/655,217, filed Mar. 17, 2022, now U.S. Pat. No. 12,008,520; which is a Continuation of U.S. application Ser. No. 16/601,492, filed Oct. 14, 2019, now U.S. Pat. No. 11,315,093; which is a Continuation of U.S. application Ser. No. 14/966,346, filed Dec. 11, 2015, now U.S. Pat. No. 11,080,672, which claims the benefit of U.S. Provisional Application No. 62/091,426, filed Dec. 12, 2014; each of which is hereby incorporated by reference in its entirety.

This application is also a Continuation-In-Part of U.S. application Ser. No. 17/086,357, filed Oct. 31, 2020; which is a divisional of U.S. application Ser. No. 14/934,134, filed Nov. 5, 2015, now U.S. Pat. No. 10,860,990; which claims the benefit of U.S. Provisional Application No. 62/076,437, filed Nov. 6, 2014; each of which is hereby incorporated by reference in its entirety.

This application is also a Continuation-In-Part of U.S. application Ser. No. 17/393,168, filed Aug. 3, 2021; which is a Continuation of U.S. application Ser. No. 14/967,183, filed Dec. 11, 2015; each of which is hereby incorporated by reference in its entirety.

TECHNICAL FIELD

The present disclosure is directed generally to methods and systems for recycling consumer electronic devices and, more particularly, to methods and systems for identification, evaluation, exchange, return, and/or purchase of consumer electronic devices.

BACKGROUND

Consumer electronic devices, such as desk-based and laptop computers, mobile phones, laptop computers, notebooks, tablets, MP3 players, etc., are ubiquitous. Over 300 million desk-based and notebook computers shipped in 2013, and for the first time the number of tablet computers shipped exceeded laptops. In addition, there are over 6 billion mobile devices in use in the world; and the number of these devices is growing rapidly with more than 1.8 billion mobile phones being sold in 2013 alone. By 2017 it is expected that there will be more mobile devices in use than there are people on the planet. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their electronic devices to obtain the latest features. According to the U.S. Environmental Protection Agency, the U.S. alone disposes of over 370 million mobile phones, PDAs, tablets, and other electronic devices every year. Millions of other outdated or broken electronic devices are simply tossed into junk drawers or otherwise kept until a suitable disposal solution arises.

Although many electronic device retailers now offer mobile phone trade-in or buyback programs, many old devices still end up in landfills or are improperly disassembled and disposed of in developing countries. Unfortunately, however, electronic devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment. As an alternative to retailer trade-in or buyback programs, consumers can now recycle and/or sell their used mobile phones using self-service kiosks located in malls or other publicly accessible areas. Such kiosks are operated by ecoA™, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoA™, Inc. and are incorporated herein by reference in their entireties.

Recycling or reselling larger electronic devices (e.g., televisions, desktop PCs, game consoles, etc.) and electronic devices having irregular form factors (e.g., smartwatches, smartglasses, etc.), can present unique problems for automated inspection, analysis, and collection. Additionally, manufacturers and retailers of such electronic devices would benefit from improved systems and methods for recycling such devices. For example, this would allow manufacturers and retailers to participate in various "takeback" programs, buyback offers, to implement warranty and return policies, and to facilitate efficient recycling of these electronic devices. Additionally, certain state and federal laws provide incentives for retailers to participate in "takeback" programs that require manufacturers to assist with recycling of electronic devices. Accordingly, there continues to be a need for improving the means available to consumers for recycling or reselling such electronic devices. Simplifying the recycling/reselling process, enhancing the consumer experience, and discouraging fraud can incentivize consumers to dispose of their old electronic devices in an efficient and environmentally conscientious way.

DETAILED DESCRIPTION

Figure 1:
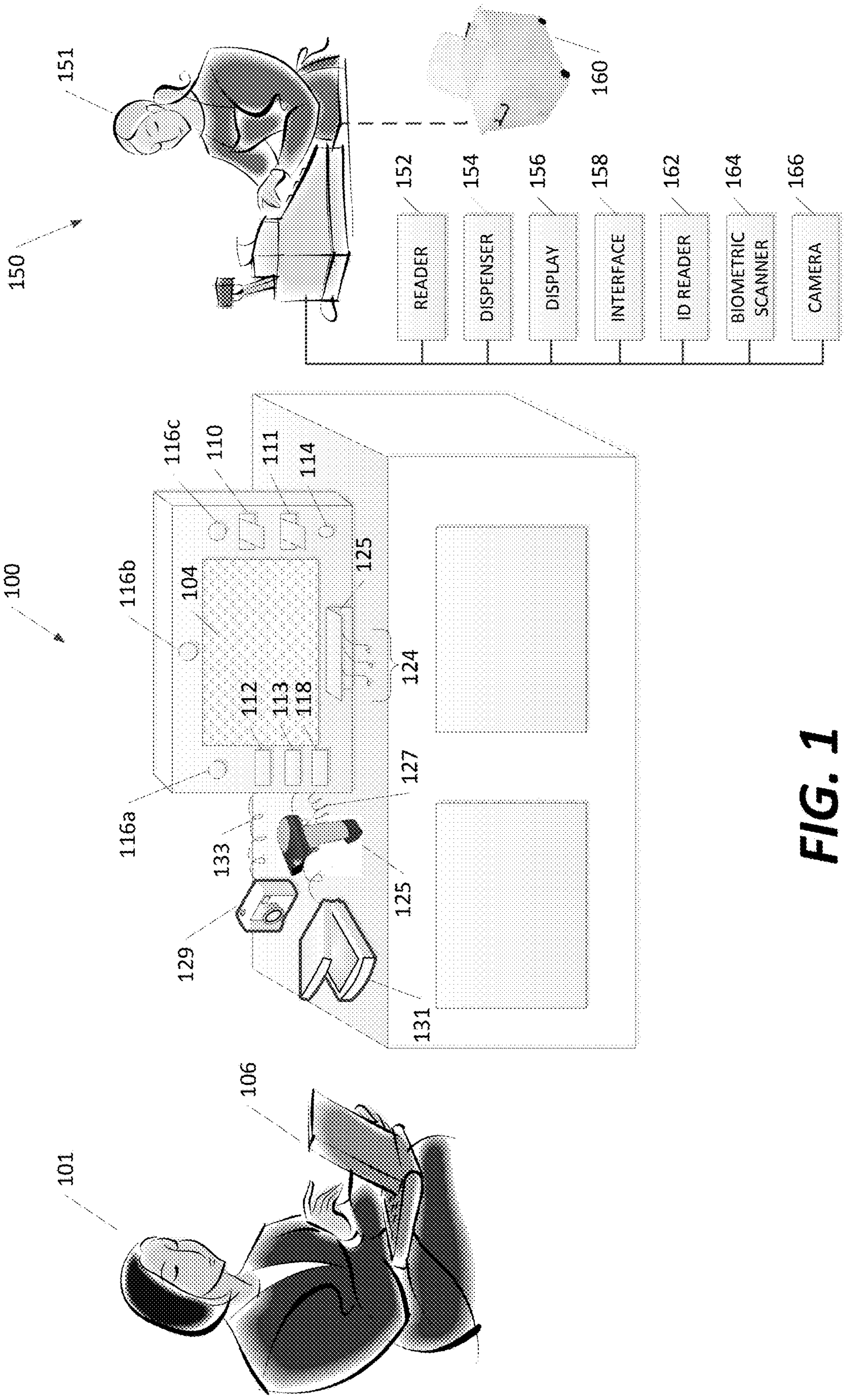
FIG. 1 is a schematic isometric view of a system configured in accordance with an embodiment of the present technology for recycling electronic devices.

The following disclosure describes various embodiments of systems and methods for the recycling and/or other processing of electronic devices. For example, the following describes various embodiments of systems for operator-assisted recycling of consumer electronic devices. Such systems can include, for example, an evaluation apparatus and a cashier terminal. Because of the size, some larger electronic devices—such as televisions, printers, game consoles, desktop PCs, and laptops—may not be well suited for automated recycling by consumer-operated kiosks. Additionally, some electronic devices having irregular form factors-such as smartwatches, smartglasses, and health monitors—may likewise not be well suited for automated recycling at such kiosks. Accordingly, it would be advantageous to provide a system that allows for efficient evaluation and inspection of such electronic devices, while allowing for operator assistance with certain procedures such as binning the devices.

The various embodiments of the systems described herein for recycling electronic devices, including large or irregularly sized electronic devices, can be particularly useful for retailers. First, such systems may allow retailers to offer recycling of electronic devices without the need for specially trained staff members. Additionally, certain state and federal laws may provide incentives for retailers to participate in "takeback" programs that require manufacturers to assist with recycling of electronic devices. Manufacturers often offer warranties or other guarantees that may require receiving and evaluating electronic devices returned by customers. In some instances, retailers may offer buyback programs in order to promote sales of new products, for example offering a customer $50 towards the purchase of a new laptop if the customer brings in an old laptop for recycling. In these and other instances, the consumer's electronic device can be returned at a convenient location using various embodiments of the operator-assisted systems described herein. These embodiments allow the electronic devices to be evaluated, inspected, binned, and compensation to be dispensed to the user. The retailer or other establishment hosting the operator-assisted recycling system may then coordinate with manufacturers or electronics recyclers to pick up the collected electronic devices.

Certain details are set forth in the following description and in FIGS. 1-6 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a schematic isometric view of system for recycling and/or other processing of mobile phones and other consumer electronic devices in accordance with embodiments of the present technology. In the illustrated embodiment, the system includes an evaluation apparatus 100 and a cashier terminal 150. The term "processing" is used herein for ease of reference to generally refer to all manner of services and operations that may be performed or facilitated by the system on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc. mobile phones, laptops, personal computers, smart watches, and other electronic devices. Although many embodiments of the present technology are described herein in the context of mobile phones, aspects of the present technology are not limited to mobile phones and generally apply to other consumer electronic devices. Such devices include, as non-limiting examples, notebook and laptop computers, DVRs, e-readers, cameras, televisions, printers, desktop computers, game consoles, all manner of mobile phones, smart phones, handheld devices, PDAs, MP3 players, tablet, etc., as well smaller electronic devices such as Google Glass™, smartwatches (e.g., Apple Watch), other wearable computers, etc. The evaluation apparatus 100 and various features thereof can be at least generally similar in structure and function to certain features of the kiosks described in U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299 13/492,835, 13/562,292, 13/658,828, 13/693,032, 13/792,030, 13/794,814, 13/794,816, 13/862,395 and 13/913,408. All of the patents and patent applications listed in the preceding sentence are commonly owned by the applicant of the present application, and they along with any other patents or patent applications identified herein are incorporated herein by reference in their entireties.

In the illustrated embodiment, the evaluation apparatus 100 is a counter-top self-service apparatus configured for use by a user 101 (e.g., a consumer, customer, retail assistant, etc.) to recycle, sell, return and/or perform other operations with a consumer electronic device 106 in, for example, a store, mall, or other retail establishment. In other embodiments, the evaluation apparatus 100 can be configured for use as a floor-mounted or wall-mounted apparatus. Although embodiments of the evaluation apparatus 100 can be configured for use by consumers, in various embodiments the evaluation apparatus 100 and/or various portions thereof can also be used by other operators, such as a retail clerk or assistant to facilitate the selling or other processing of mobile phones, laptops, smart watches, and other electronic devices.

In the illustrated embodiment, the evaluation apparatus 100 includes a housing 102 that can be of conventional manufacture from, for example, sheet metal, plastic panels, etc. A plurality of user interface devices are provided on an exterior (e.g., front portion) of the housing 102 for providing instructions and other information to users, and/or for receiving user inputs and other information from users. For example, the evaluation apparatus 100 can include a display screen 104 (e.g., a liquid crystal display (LCD)) for providing information, prompts, etc. to users via text, graphics, video, etc. The display screen 104 can include a touch screen for receiving user inputs and responses to displayed prompts. In addition or alternatively, the evaluation apparatus 100 can include a separate keyboard or keypad for this purpose. The evaluation apparatus 100 can also include an ID reader or scanner 112 (e.g., a driver's license scanner), a biometric scanner (e.g., fingerprint reader) 114, and one or more cameras 116 (e.g., digital still and/or video cameras, identified individually as cameras 116*a-c*). The evaluation apparatus 100 can additionally include a plurality of output devices such as a label printer having an associated outlet 110, a receipt or voucher printer having an outlet 111, a card writer coupled with a card dispenser 113 for dispensing cards containing value (e.g., prepaid debit cards, gift cards, etc.), and a cash dispenser having an outlet 118. Although not identified in FIG. 1, the evaluation apparatus 100 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), as well as other user input and output devices. The input devices may include a touchpad, a pointing device such as a mouse, a joystick, pen, game pad, motion sensor, scanner, etc. Additionally the evaluation apparatus 100 can also include a bar code reader, QR code reader, bag/package dispenser, a digital signature pad, etc.

Additionally, the evaluation apparatus 100 includes a plurality of electrical connectors 124 configured to connect to a wide variety of consumer electronic devices. The connectors 124 can include, for example USB connectors, micro-USB connectors, Lightning connectors, FireWire connectors, etc. for temporary connection to electronic devices that can be received by then evaluation apparatus 100, such as mobile phones, laptops, printers, smart watches, etc. The electrical connectors 124 can additionally include an AC plug to provide power for certain devices, e.g., desktop computers, televisions, printers, game consoles, etc. The evaluation apparatus 100 can further include a scanner 125 which can be, for example, a hand-held barcode scanner. In some embodiments, the scanner can be a linear barcode reader, a QR code reader, an NFC reader, or other optical or electrical scanning device. In the illustrated embodiment, the scanner 125 is tethered to the evaluation apparatus by a cord 127, allowing the user to manually operate the scanner to read a barcode or other indicia on the electronic device. In other embodiments, the scanner can be rigidly fixed to the evaluation apparatus, or in other embodiments the scanner may be physically separated from the evaluation apparatus 100 and may wirelessly communicate with the apparatus 100. The apparatus 100 can additionally include one or more external cameras 129, a flatbed scanner 131, and/or other imaging components in addition to the cameras 116*a-c* to view, photograph and/or otherwise visually evaluate the electronic device 106 from multiple perspectives. In some embodiments, the camera 129 can be tethered to the evaluation apparatus by a cord 133, allowing the user to manually operate the camera 129 to obtain an image of the device. In some embodiments, one or more of the external camera 129, the cameras 116*a-c*, and/or other imaging components discussed above can be movable to facilitate device visual evaluation. One or more of the cameras 116*a-c* can also be configured to capture images of the user 101 for identity verification and to avoid fraud.

Certain features of the cashier terminal 150 may be at least generally similar in structure and function to conventional counter-top cashier terminals found at point of sale (POS) locations in retail stores for purchasing of goods and services. In the illustrated embodiment, cashier terminal 150 is configured for use by a clerk 151 (e.g., a store employee, cashier, assistant, etc.) to facilitate recycling of consumer electronic devices in conjunction with the user-operated evaluation apparatus 100. In other embodiments, the cashier terminal 150 can be configured for use as a floor-mounted or wall-mounted apparatus, as a specialized processing device, and/or integrated into the apparatus 100.

FIG. 1 schematically illustrates several components of the cashier terminal 150. For example, the cashier terminal 150 includes a reader 152 that can be used to retrieve unique identifiers which are generated by the evaluation apparatus 100 and associated with the electronic device 106. The reader 152 can be, for example, an optical scanner (e.g., barcode scanner, QR code scanner), or a wireless electronic reader (e.g., RFID, NFC, etc.), or other device for reading machine-readable media. In some embodiments, the clerk 151 can manually enter the unique identifier (e.g., an alphanumeric string) via interface 158, which can be for example a touch screen associated with a display screen 156, a keyboard, etc.

A plurality of user interface devices are provided on the cashier terminal 150 for providing instructions and other information to the clerk 151, and/or for receiving inputs and other information from the clerk 151. For example, the cashier terminal 150 can include one or more of the display screens 156 (e.g., a liquid crystal display (LCD)) for providing information, prompts, etc. to the clerk 151. One or more additional display screens (e.g., outward-facing display screens) can also be provided for displaying information to a customer (e.g., the user 101). A user interface 158 is configured to receive input from the clerk 151. In some embodiments, the user interface 158 includes a touch screen associated with the display screen 156 for receiving clerk input and responses to displayed prompts. In addition or alternatively, the cashier terminal 150 can include a separate keyboard or keypad for this purpose. In the illustrated embodiment, the cashier terminal 150 also includes a payment dispenser 154 for dispensing payment to a customer in exchange for the electronic device. In some embodiments, the payment dispenser 154 can be a cash drawer, a card dispenser (e.g., to dispense gift cards with stored value), a voucher printer, an electronic payment device (e.g., a terminal for making electronic wire transfers, PayPal transfers, Bitcoin transfers, etc.), etc. The cashier terminal 150 can also be associated with a bin 160 or other collection station or facility for receiving the electronic devices from customers for secure storage, trade-ins, and/or further processing and recycling. In some embodiments, the bin 160 can be remote from the other components of the cashier terminal 150, for example the bin 160 can be positioned in another location within a store, a warehouse, etc. In some embodiments, the bin 160 can be proximate to the other components, for example the bin 160 can be located beneath the cashier terminal 150. In some embodiments, the bin 160 can be coupled with a scanner or other reader which can read the identifying labels affixed to electronic devices as they are deposited into and/or removed from the bin 160.

The cashier terminal 150 can also include an ID reader or scanner (e.g., a driver's license scanner) 162, a biometric scanner (e.g., fingerprint reader) 164, and one or more cameras (e.g., digital still and/or video cameras) 166. The cashier terminal 150 can further include a speaker and/or a headphone jack for audibly communicating information to users and the clerk, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices may include a touchpad, a pointing device such as a mouse, a joystick, pen, game pad, motion sensor, scanner, etc. Additionally the cashier terminal 150 can also include a barcode reader, QR code reader, bag/package dispenser, a digital signature pad, etc. In some embodiments, the cashier terminal 150 can also include a plurality of electrical connectors configured to connect to a wide variety of consumer electronic devices such as, for example, USB connectors, micro-USB connectors, Lightning connectors, FireWire connectors, etc.

Figure 2:
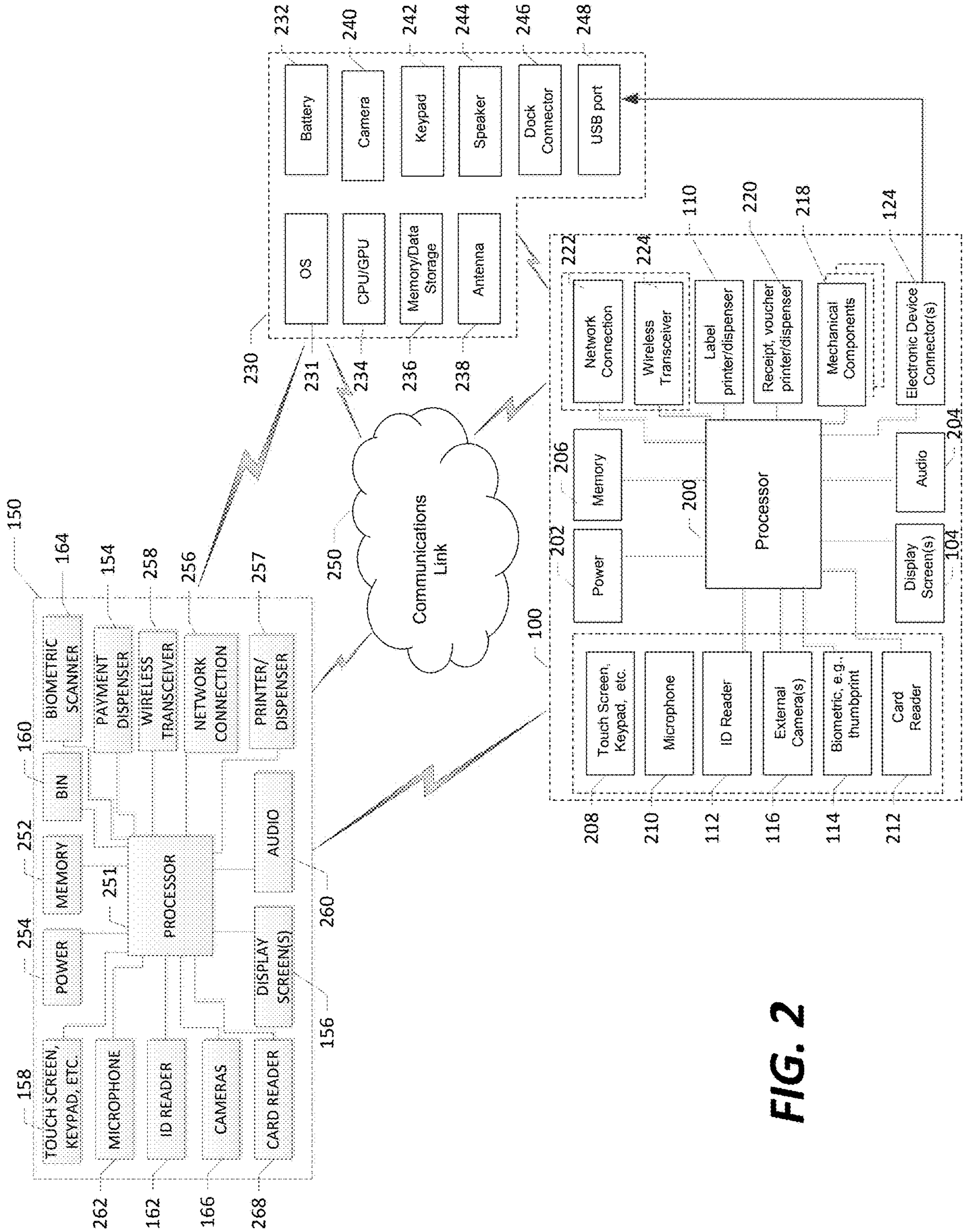
FIG. 2 is a schematic diagram illustrating various components associated with the system of FIG. 1 configured in accordance with an embodiment of the present technology for recycling electronic devices.

FIG. 2 provides a schematic representation of an architecture of the evaluation apparatus 100 and the cashier terminal 150 in accordance with an embodiment of the present technology. In the illustrated embodiment, the evaluation apparatus 100 includes a suitable processor or central processing unit (CPU) 200 that controls operation of the evaluation apparatus 100 in accordance with computer-readable instructions stored on system memory 206. The CPU 200 may be any logic processing unit, such as one or more CPUs, digital signal processors (DSPs), application-specific integrated circuits (ASICs), etc. The CPU 200 can include, by way of example, a standard personal computer (PC) (e.g., a DELL OPTIPLEX 7010 PC) or other type of embedded computer running any suitable operating system, such as Windows, Linux, Android, IOS, or an embedded real-time operating system. In some embodiments, the CPU 200 can be a small form factor PC with integrated hard disk drive (HDD) or solid-state drive (SSD) and universal serial bus (USB) or other ports to communicate with the other components of the evaluation apparatus 100. In other embodiments, the CPU 200 can include a microprocessor with a standalone motherboard that interfaces with a separate HDD. The memory 206 can include read-only memory (ROM) and random access memory (RAM) or other storage devices, such as disk drives or SSDs, that store the executable applications, test software, databases and other software required to, for example, control evaluation apparatus components, process electronic device information and data (to, e.g., evaluate device make, model, condition, pricing, etc.), communicate and exchange data and information with remote computers and other devices, etc.

The CPU 200 can provide information and instructions to users via the display screen 104 and/or an audio system (e.g., a speaker) 204. The CPU 200 can also receive user inputs via, e.g., a touch screen 208 associated with the display screen 104, a keypad with physical keys, and/or a microphone 210. Additionally, the CPU 200 can receive personal identification and/or biometric information associated with users via the ID reader 112, one or more of the external cameras 116, and/or the fingerprint reader 114. In some embodiments, the CPU 200 can also receive information (such as user identification and/or account information) via a card reader 212 (e.g., a debit, credit, or loyalty card reader having, e.g., a suitable magnetic stripe reader, optical reader, etc.). The CPU 200 can also control operation of a label printer/dispenser associated with the outlet 110 and systems for providing remuneration to users, such as a cash dispenser associated with the outlet 118, and/or a receipt or voucher printer and dispenser 220 associated with the outlet 111.

As noted above, the evaluation apparatus 100 additionally includes a number of electronic, optical and electromechanical devices for electrically, visually and/or physically analyzing electronic devices received at the evaluation apparatus 100 for recycling and/or other processing. Such systems can include one or more of the cameras 116*a-c* for visually inspecting electronic devices for, e.g., determining external dimensions and condition, and one or more of the electrical connectors 124 (e.g., USB connectors) for, e.g., powering up electronic devices and/or performing electronic analyses. Mechanical components 218 can include, for example, an openable cover 125 which covers the electrical connectors 124 when not in use. The evaluation apparatus 100 further includes power 202, which can include battery power and/or facility power for operation of the various electrical components associated with evaluation apparatus operation.

In the illustrated embodiment, the evaluation apparatus 100 further includes a network connection 222 (e.g., a wired connection, such as an Ethernet port, cable modem, FireWire cable, Lightning connector, USB port, etc.) suitable for communication with, e.g., all manner of processing devices (including remote processing devices) via a communication link 250, and a wireless transceiver 224 (e.g., including a WiFi access point; Bluetooth transceiver; near-field communication (NFC) device; wireless modem or cellular radio utilizing GSM, CDMA, 3G and 4G technologies; etc., each of which may include an associated antenna or antennas) suitable for communication with, e.g., all manner of processing devices (including remote processing devices) via the communication link 250 and/or directly via, e.g., a wireless peer-to-peer connection. For example, the wireless transceiver 224 can facilitate wireless communication with electronic devices, such as, e.g., an electronic device 230 e.g., a laptop, personal computer, smartwatch, e-reader, camera, TV, DVR, game console, Google Glass™; smartwatches, other wearable computers, mobile phone, etc. either in the proximity of the evaluation apparatus 100 or remote therefrom. By way of example only, in the illustrated embodiment the electronic device 230 is depicted as a laptop computer and can include one or more features, applications and/or other elements commonly found in laptops and other known electronic devices. For example, the electronic device 230 can include a CPU and/or a graphics processing unit (GPU) 234 for executing computer readable instructions stored on memory 236. In addition, the electronic device 230 can include an internal power source or battery 232, a dock connector 246, a USB port 248, a camera 240, and/or well-known input devices, including, for example, a keypad 242, a touch screen, etc. In many embodiments, the electronic device 230 can also include a speaker 244 for two-way communication and audio playback. In addition to the foregoing features, the electronic device 230 can include an operating system (OS) 231 and/or a device wireless transceiver that may include one or more antennas 238 for wirelessly communicating with, for example, other electronic devices, websites, the cashier terminal 150, and the evaluation apparatus 100. Such communication can be performed via, e.g., the communication link 250 (which can include the Internet, public and private intranet, a local or extended WiFi network, cell towers, the plain old telephone system (POTS), etc.), direct wireless communication, etc.

In the illustrated embodiment, the cashier terminal 150 includes a suitable processor or central processing unit (CPU) 251 that controls operation of the cashier terminal 150 and associated components in accordance with computer-readable instructions stored on system memory 252. Similar to the CPU 200 associated with the evaluation apparatus 100, the CPU 251 may be any logic processing unit, such as one or more CPUs, digital signal processors (DSPs), application-specific integrated circuits (ASICs), etc. The CPU 251 can include, by way of example, a standard personal computer (PC) (e.g., a DELL OPTIPLEX 7010 PC) or other type of embedded computer running any suitable operating system, such as Windows, Linux, Android, IOS, or an embedded real-time operating system. In some embodiments, the CPU 251 can be a small form factor PC with integrated hard disk drive (HDD) or solid-state drive (SSD) and universal serial bus (USB) or other ports to communicate with the other components of the cashier terminal 150. In other embodiments, the CPU 251 can include a microprocessor with a standalone motherboard that interfaces with a separate HDD. The memory 252 can include read-only memory (ROM) and random access memory (RAM) or other storage devices, such as disk drives or SSDs, that store the executable applications, test software, databases and other software required to, for example, control evaluation apparatus components, process electronic device information and data (to, e.g., evaluate device make, model, condition, pricing, etc.), communicate and exchange data and information with remote computers and other devices, etc.

The CPU 251 can provide information and instructions to the clerk 151 via the display screen 156 and/or an audio system (e.g., a speaker) 260. The CPU 251 can also receive user inputs via, e.g., a touch screen 158 associated with the display screen 156, a keypad with physical keys, and/or a microphone 262. Additionally, the CPU 251 can receive personal identification information associated with users (e.g., persons recycling electronic devices with the apparatus 100) via the ID reader 264, the biometric scanner 259 (e.g., a fingerprint scanner), or the one or more of the cameras 266. In some embodiments, the CPU 251 can also receive information (such as user identification and/or account information) via a card reader 268 (e.g., a debit, credit, or loyalty card reader having, e.g., a suitable magnetic stripe reader, optical reader, etc.). The CPU 251 can also control operation of the receipt or voucher printer 257 and systems for providing remuneration to users, such as the payment dispenser 154.

In the illustrated embodiment, the cashier terminal 150 further includes a network connection 256 (e.g., a wired connection, such as an Ethernet, modem, cable, etc.) suitable for communication with, e.g., all manner of remote processing device via a communication link 250, and a wireless transceiver 258 (e.g., including a wireless modem utilizing GSM, CDMA, 3G and 4G technologies, each of which may include an associated antenna or antennas) for data communications suitable for communication with, e.g., all manner of remote processing device via the communication link 250 and/or directly via, e.g., a wireless peer-to-peer connection. For example, the wireless transceiver 258 can facilitate wireless communication with electronic devices, such as an electronic device 230 (e.g., a laptop) either in the proximity of the cashier terminal 150 or remote therefrom. As noted above, such communication can be performed via, e.g., the communication link 250 (which can include the Internet, and intranet, cell towers, the plain old telephone system (POTS), etc.), direct wireless communication, etc.

Unless described otherwise, the construction and operation of the various components depicted in FIG. 2 are of conventional design. As a result, such components need not be described in further detail herein, as they will be readily understood by those skilled in the relevant art. In other embodiments, the evaluation apparatus 100, the cashier terminal 150, and/or the electronic device 230 can include other features that may be different from those described above. In still further embodiments, the evaluation apparatus 100 the cashier terminal 150, and/or the electronic device 230 can include more or fewer features similar to those described above.

Figure 3:
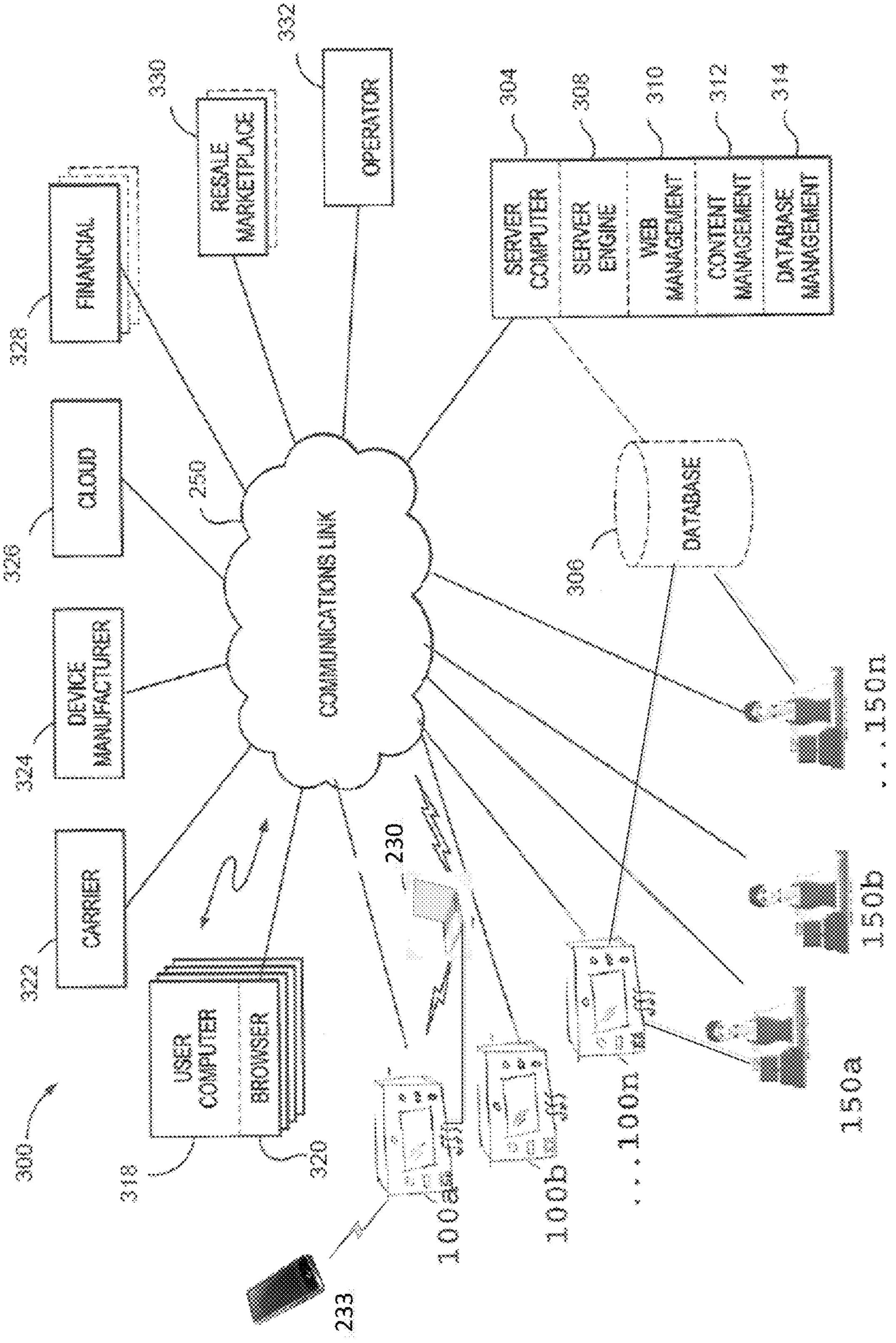
FIG. 3 is a schematic diagram of a suitable distributed computing environment for implementing various aspects of the present technology.

FIG. 3 is a schematic diagram of a suitable network environment for implementing various aspects of an electronic device recycling system 300 configured in accordance with embodiments of the present technology. In the illustrated embodiment, a plurality of the evaluation apparatuses 100 (identified individually as evaluation apparatuses 100*a*-100*n*) can exchange information with one or more remote computers (e.g., one or more server computers 304) via the communication link 250. Although the communication link 250 can include a publicly available network (e.g., the Internet with a web interface), a private communication link, such as an intranet or other network may also be used. Moreover, in various embodiments the individual evaluation apparatus 100 can be connected to a host computer (not shown) that facilitates the exchange of information between the evaluation apparatuses 100 and remote computers, other apparatuses, mobile devices, etc. Similarly, a plurality of the cashier terminals 150 (identified individually as cashier terminals 150*a*-150*n*) can exchange information with one or more remote computers via the communication link 250.

The server computer 304 can perform many or all of the functions for receiving, routing and storing of electronic messages, such as webpages, audio signals and electronic images necessary to implement the various electronic transactions described herein. For example, the server computer 304 can retrieve and exchange web pages and other content with an associated database or databases 306. In some embodiments, the database 306 can include information related to mobile phones and/or other consumer electronic devices. Such information can include, for example, make, model, serial number, International Mobile Equipment Identity number (IMEI) Mobile Equipment Identifier (MEID), carrier plan information, pricing information, owner information, etc., as well as dimensional information (size, shape, location of displays, ports, etc.) and other visual information (e.g., logo shapes, sizes, locations, etc.) associated with known devices, such as particular device models, submodels, etc. In various embodiments the server computer 304 can also include a server engine 308, a web page management component 310, a content management component 312, and a database management component 314. The server engine 308 can perform the basic processing and operating system level tasks associated with the various technologies described herein. The webpage management component 310 can handle creation and/or display and/or routing of web or other display pages. The content management component 312 can handle many of the functions associated with the routines described herein. The database management component 314 can perform various storage, retrieval and query tasks associated with the database 306, and can store various information and data such as animation, graphics, visual and audio signals, etc.

In the illustrated embodiment, the evaluation apparatuses 100 and/or the cashier terminals 150 can also be operably connected to a plurality of other remote devices and systems via the communication link 250. For example, the evaluation apparatuses 100 and/or the cashier terminals 150 can be operably connected to a plurality of user devices 318 (e.g., personal computers, laptops, handheld devices, etc.) having associated browsers 320. Similarly, as described above the evaluation apparatuses 100 and the cashier terminals 150 can each include wireless communication facilities for exchanging digital information with mobile devices, such as the electronic device 230, and a mobile phone 233. The evaluation apparatuses 100, the cashier terminals 150, and/or the server computer 304 are also operably connectable to a series of remote computers for obtaining data and/or exchanging information with necessary service providers, financial institutions, device manufactures, authorities, government agencies, etc. For example, the evaluation apparatuses 100, the cashier terminals 150, and the server computer 304 can be operably connected to one or more cell carriers 322, one or more device manufacturers 324 (e.g., laptop manufacturers), one or more electronic payment or financial institutions 328, one or more databases (e.g., the GSMA International Mobile Equipment Identity Database, etc.), and one or more computers and/or other remotely located or shared resources associated with cloud computing 326. The financial institutions 328 can include all manner of entity associated with conducting financial transactions, including banks, credit/debit card facilities, online commerce facilities, online payment systems, virtual cash systems, money transfer systems, etc.

In addition to the foregoing, the evaluation apparatuses 100, the cashier terminals 150, and the server computer 304 can also be operably connected to a resale marketplace 330 and an operator 332. The resale marketplace 330 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The operator 332 can be a central computer or system of computers for controlling all manner of operation of the network of evaluation apparatuses 100 and cashier terminals 150. Such operations can include, for example, remote monitoring and facilitating of evaluation apparatus maintenance (e.g., remote testing of evaluation apparatus functionality, downloading operational software and updates, etc.), servicing (e.g., periodic replenishing of cash and other consumables), performance, etc. In addition, the operator 332 can further include one or more display screens operably connected to cameras located at each of the evaluation apparatuses 100 (e.g., one or more of the cameras 116 described above with reference to FIG. 1). This remote viewing capability enables operator personnel to verify user identification and/or make other visual observations at the evaluation apparatuses 100 in real-time during transactions, as described above with reference to FIG. 1.

The foregoing description of the electronic device recycling system 300 illustrates but one possible network system suitable for implementing the various technologies described herein. Accordingly, those of ordinary skill in the art with appreciate that other systems consistent with the present technology can omit one or more of the facilities described in reference to FIG. 3, or may include one or more additional facilities not described in detail in FIG. 3.

Figure 4:
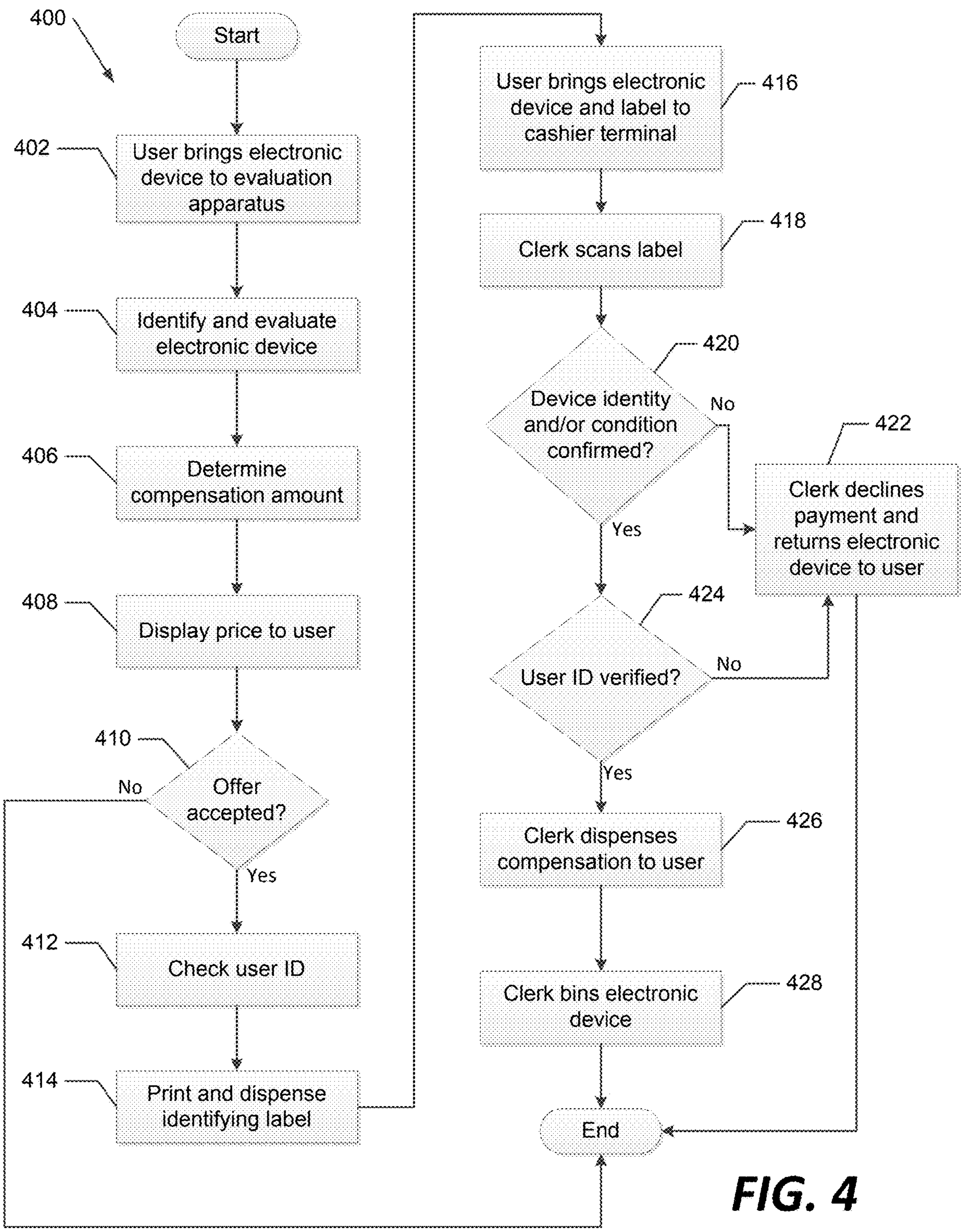
FIG. 4 is a flow diagram illustrating a method of recycling an electronic device in accordance with an embodiment of the present technology.

FIG. 4 is a representative flow diagram of a routine 400 for recycling an electronic device in accordance with some embodiments of the present technology. In some embodiments, the routine can be performed by the apparatus 100 and/or the cashier terminal 150 described above. This flow diagram does not show all functions or exchanges of data, but instead provides an understanding of commands and data exchanged under the system. Those skilled in the relevant art will recognize that some functions or exchange of commands and data may be repeated, varied, omitted, or supplemented, and other (less important) aspects not shown may be readily implemented.

The routine 400 begins in block 402 with a user bringing an electronic device to an evaluation apparatus, e.g., one of the evaluation apparatuses 100 described above with reference to FIGS. 1-3. Referring to FIG. 1 in conjunction with FIG. 4, the electronic device 106 may be, for example, a laptop computer. As noted above, the electronic device can take various other forms, such as a smart television, printer, game console, desktop PC, mobile phone, tablet, wearable computing device, etc. Routine 400 continues in block 404 with the electronic device being identified and evaluated. In various embodiments, the identification and evaluation can include electrical analysis, visual analysis, or both by the evaluation apparatus 100. In some embodiments, the user 101 may initiate the routine by interacting with touch screen 208 on the evaluation apparatus 100 (FIGS. 1 and 2). For example, the user 101 can indicate the type of device the user 101 wishes to sell in response to a menu and/or prompts on the display screen 104. In some embodiments, the evaluation apparatus 100 can query the electronic device automatically to determine the type of device. Next, the user may be prompted to remove any cases, stickers, or other accessories from the device so that it can be accurately evaluated. The user may be prompted to plug an appropriate one or more of the electronic connectors 124 into the corresponding port (e.g., a USB port) on the electronic device 106. If needed, the user 101 may also plug a power cord for the electronic device 106 into the AC outlet. After connecting the device, the evaluation apparatus 100 performs an electrical inspection to further evaluate the condition of the electronic device 106 as well as specific component and operating parameters such as memory, processor, make, model, etc. In addition or alternatively, in some embodiments the electrical inspection can include a determination of phone manufacturer information (e.g., a vendor identification number or VID) and product information (e.g., a product identification number or PID), and/or determination of the International Mobile Station Equipment Identity (IMEI) number or Mobile Equipment Identifier (MEID) number associated with the device. In some embodiments, the electrical analysis can be performed wirelessly, for example via software installed on the electronic device for remote analysis. In some embodiments, the evaluation apparatus 100 can perform the electrical analysis using one or more of the methods and/or systems described in detail in the commonly owned patents and patent applications identified herein and incorporated by reference in their entireties.

In some embodiments, the electrical analysis can include evaluating the condition and/or functionality of the charging circuit of the electronic device. In particular, the testing electronics measure the amount of charge current that the charging circuit draws on the power lines, and the testing electronics use the corresponding current measurement signal to determine whether the charging circuit is functional or damaged. In general, charging circuits can become damaged by statistic discharge or when they are overheated, exposed to water, or connected to a non-standard power supply. If a charging circuit is damaged, it might not regulate charge current properly (if at all), which can cause damage to a battery. For example, a damaged charging circuit might have a slow charge rate or a very rapid charge rate. In many cases, a charging circuit is difficult and expensive, if not impossible, to replace because it is typically located on a primary circuit board or co-located on a processor chip. Thus, an electronic device with a damaged charging circuit may have little market value due to the impracticability of replacing the charging circuit.

In some embodiments, the electrical analysis can include detecting whether a charging circuit is damaged by determining if the current is below a maximum current threshold, above a minimum current threshold, or within a range that falls between the maximum and minimum current thresholds. The testing electronics can also measure other types of electrical quantities associated with the charge current, such as AC frequency or DC pulse widths. For example, in some mobile devices, the charge current may begin to pulse when the battery is fully charged. In an additional or alternate embodiment, the testing electronics can apply an AC test voltage to test capacitors, transistors, or other reactive circuit elements of mobile device hardware.

In some embodiments, the current measurement signal can be compared to reference quantities corresponding to the electrical characteristics of a particular make and/or model of an electronic device. For example, the routine can include looking up device signatures in a look-up table stored in memory. The reference quantities in the device signature can include, for example, the charge current thresholds, the amount of power that the device is supposed to draw on the power line, the expected impedance between the power line and circuit ground, and/or other known reference quantities associated with particular types of makes and/or model of mobile devices.

In some embodiments, the evaluation apparatus can operate via the electrical connectors in a manner similar to that of a USB host device. For example, the evaluation apparatus can assign a unique address to the electronic device and exchange USB packets directly with the electronic device. For example, in one embodiment the evaluation apparatus can request USB device descriptors from the electronic device. In some embodiments, the evaluation apparatus can communicate via the electrical connector directly with a processor of the electronic device to access the device's hardware components over a debugging interface, such as the android debugging bridge (ADB) or over a hardware abstraction interface. In one embodiment, the evaluation apparatus can use such interfaces to operate (e.g., activate, access, control, enable, and/or disable) hardware components, such as the electronic device's camera, display, memory, vibrator motor(s), etc. For example, the evaluation apparatus can use a software interface to access the electronic device's memory to retrieve an image and display the image on the device's display screen, if applicable. In another embodiment, the evaluation apparatus can communicate with a so-called smart charging circuit, which has logic that enables the charging circuit to be turned on or off and/or to draw different levels of charge current. The evaluation apparatus can also use shell access to identify hardware on the electronic device. For example, the evaluation apparatus can use shell access to detect any non-OEM hardware that may have been installed on the electronic device.

Following the electrical evaluation, in some embodiments the user 101 may be prompted to utilize a scanner to scan a barcode on the electronic device, or to manually enter a serial number or similar identifying number or feature associated with the electronic device 106. For example, in some electronic devices the serial number or similar identifying number may be visible on an external surface (e.g., displayed on the bottom side of a laptop, under a battery, etc.). In some embodiments, a barcode could be implemented on the electronic device such that the barcode is invisible to the user, but is readable via infrared or ultraviolet light. In some electronic devices, a user can navigate an operating system of the electronic device to obtain the serial number or other identifying number (e.g., In some embodiments, the electronic device 106 can also be visually inspected via cameras 116*a-c*, user-operated camera 129, flatbed scanner 107 or other imaging system coupled to the evaluation apparatus 100. For example, in some embodiments the user may be prompted (e.g., via display screen 104) to obtain images of the electronic device 106 via the user-operated camera 129, the flatbed scanner 107, or other imaging components. The user may be prompted in particular to position the electronic device in an imaging area of the counter, or at a particular position on the flatbed scanner. In some embodiments, the visual inspection can include a 3D visual analysis to confirm the identification of the electronic device 106 (e.g. make and model) and/or to evaluate or assess the condition and/or function of the electronic device 106 and/or its various components and systems. In some embodiments, the visual inspection can include a computer-implemented visual analysis (e.g., a three-dimensional ("3D") analysis) performed by a processor 200 within the kiosk (e.g., a CPU) to confirm the identification of the electronic device 106 (e.g. make, model and/or sub-model) and/or to evaluate or assess the condition and/or function of the electronic device 106 and/or its various components and systems. For example, the visual analysis can include computer-implemented evaluation (e.g., a digital comparison) of images of the electronic device 106 taken by the cameras 116 and/or user-operated camera 129 from top, side and/or end view perspectives to determine length, width, and/or height (thickness) dimensions of the electronic device 106. In some embodiments, the visual analysis can include an inspection of a display screen on the electronic device 106 for cracks or other damage. In some embodiments, the evaluation apparatus 100 can perform the visual analysis using one or more of the methods and/or systems described in detail in the commonly owned patents and patent applications identified herein and incorporated by reference in their entireties.

In some embodiments, evaluation of the electronic device can involve user interaction. For example, once the electronic device 106 is connected to one of the electrical connectors 124, the apparatus 100 can instruct the electronic device 106 to start up and run a program. The user may then be instructed to answer prompts on the screen of the electronic device. For example, a message may be displayed on the screen asking the user to enter a certain set of characters. If the user correctly enters these characters, then it can be inferred that both the screen and the keyboard of the electronic device are operative. In some embodiments, the evaluation apparatus 100 invokes a message on the screen of the electronic device 106 to be recycled which asked the user permission to inspect the electronic device 106, look at the system file, and determine its components content. If the user 101 is able to read the message it indicates that the display is functional. If the user is then able to use the mouse and keyboard to reply with permission it indicates that those inputs are also functional. In some embodiments, the user interaction with the electronic device 106 can also yield additional information, for example information obtained from the system file.

In some embodiments, the inspection and analysis may include only barcode scanning or other identification of the device. For example, in the case of printers, it may be impractical or simply not useful to electrically interrogate the printer, and accordingly the analysis may include merely scanning the barcode or entering the serial number of the printer.

Routine 400 continues in block 406 by determining a compensation amount for the electronic device 106. Based on the identification and evaluation of the electronic device 106, the evaluation apparatus 100 can determine an estimated price or an estimated range of prices to offer to the user 101 for the device 106. In some embodiments, the evaluation apparatus 100 may query a database comprising a lookup table with various prices for a range of identified electronic devices depending on their evaluated conditions. As one example, the lookup table may indicate that for a particular laptop make and model, three different prices are available depending on the determined condition (e.g., poor condition-$100, fair condition-$200, good condition-$300). The evaluation apparatus may grade the condition of the laptop automatically based on the visual and/or electrical inspection. Based on the graded condition of the laptop, the evaluation apparatus 100 may query the database and receive a compensation amount to be offered to the user. In some embodiments, the price may not depend on the condition of the electronic device, but only on the make and model.

In some embodiments, determining the compensation amount (purchase price) includes determining whether any specific promotions and/or additional rewards or rebates from the retailer, manufacturer of the device, or any other entity, are associated with the electronic device. For example, if a laptops of a certain brand are eligible for an advertised store credit amount upon trade-in, the evaluation apparatus 100 can determine whether the electronic device 106 is eligible and, if so, notify the user 101. This can be particularly valuable for retailers who desire to provide a broad spectrum of different promotions for trade-in or trade-up programs to incentivize recycling but face the difficulty for store staff to correctly identify so many different makes and models of different devices, as well as remembering a long list of specific promotions for each. In some embodiments, various options for the compensation can be determined, for example $50 in cash or $100 in store credit towards the purchase of a new laptop. For example, the evaluation apparatus 100 may query a database to determine the price for a particular electronic device based on the evaluated condition. In some embodiments, the database can include a lookup table that includes, in addition to a monetary amount, any applicable rebates, specific promotions, etc. For example, the lookup table may indicate that for a particular identified electronic device having an evaluated condition of "fair" or "good", the price can be either $50 in cash or $100 in store credit towards the purchase of a new laptop. Various other promotions, rebates, coupons, and other promotions can be stored in the lookup table. Accordingly, the evaluation apparatus 100 may offer a user a variety of compensation amounts, whether cash, trade-in value, discount coupons, or otherwise, based on the identification and evaluation of the electronic device.

In block 408, the determined price or other compensation offers are displayed to the user, for example via display screen 104. In decision block 410, the user accepts or declines the offer. If the user 101 declines the price (via, e.g., the touch screen 208), the user can disconnect the connector 124 from the electronic device 106, and retrieve the electronic device 106. If the user accepts the offered compensation amount, the routine continues in block 412 to verify the user identification. In some embodiments, the user 101 may be prompted to place his or her identification (e.g., a driver's license) in the ID scanner 112 and/or provide a thumbprint via the fingerprint reader 114. As a fraud prevention measure, the evaluation apparatus 100 can be configured to transmit an image of the driver's license to a remote computer screen, and an operator at the remote computer can visually compare a display of the picture (and/or other information) on the driver's license to the person standing in front of the evaluation apparatus 100 as viewed by one or more of the cameras 116*a-c* (FIG. 1) to confirm that the person attempting to sell the electronic device 106 is in fact the person identified by the driver's license. In some embodiments, one or more of the cameras 116*a-c* can be movable to facilitate viewing of users, as well as other individuals in the proximity of the evaluation apparatus 100. Additionally, the user's fingerprint can be checked against records of known fraud perpetrators. If either of these checks indicate that the person selling the electronic device presents a fraud risk, the transaction can be declined and the electronic device 106 returned. In some embodiments, the user 101 is prompted to enter additional information via the touch screen 208, for example make and model, place or purchase, user demographic information (gender, age, location, etc.).

After the user's identification has been checked, in block 414 an identifying label is printed and dispensed to the user to be affixed to the electronic device. For example, the evaluation apparatus 100 may print and dispense a unique identification label (e.g., a small adhesive-backed sticker with a QR code, barcode, etc.) from the label outlet 110 for the user to adhere to the electronic device 106. In some embodiments, the identifying label is not intended to be affixed to the electronic device 106, but rather the user 101 can carry both the electronic device 106 and the label or tag to the cashier terminal 150. In some embodiments, rather than printing a physical label, an electronic representation (e.g., QR code, barcode, alphanumeric string) can be transmitted to a user's mobile device (e.g., via MMS, SMS, email, etc.), for example mobile phone 233 (FIG. 3). In some embodiments, the printed label can include the obtained information about the electronic device 106, for example its make, model, serial number, condition, its determined value, related promotions, etc., with additional instructions for the user 101 to take the electronic device 106 and the label to the clerk 151 at the cashier terminal 150 to redeem the reward and physically turn in the electronic device 106.

In some embodiments, the identifying label can include machine-readable indicia associated with the identified electronic device. For example, the label can include a barcode, QR code, or other machine-readable indicia that, when scanned at the cashier terminal 150, retrieves the obtained information about the electronic device. In some embodiments, information obtained from the evaluation and identification performed at the evaluation apparatus 100 can be stored electronically and may be retrieved by the cashier terminal 150 upon reading the machine-readable indicia. In some embodiments, additional information obtained from other databases can be obtained upon reading the machine-readable indicia, including any applicable takeback offers, rebates, coupons, etc.

Routine 400 continues in block 416 with the user affixing the label to the electronic device and bringing the electronic device to the cashier terminal 150. As noted above, in some embodiments the label need not be affixed to the electronic device 106, but may be presented by the user 101 to the clerk 151 at the cashier terminal 150. In some embodiments, the user may be instructed to take the electronic device and the label to the cashier terminal, either via instructions printed on the label, instructions displayed on the display 104 of the evaluation apparatus 100, or other instructions such as physical placards in the vicinity of the evaluation apparatus 100. In block 418, the clerk 151 scans the identifying label. In some embodiments, the clerk 151 at the cashier terminal 150 can use the reader 152 to read the machine-readable indicia on the label presented by the user 101. The reader 152 can be, for example a barcode reader, QR code reader, or other such scanner.

In block 420, the device identity and/or condition is verified at the cashier terminal. For example, in some embodiments the clerk 151 can visually inspect the electronic device and compare it to the information provided on the label to determine whether the make, model, and other information are correct. In some embodiments, the display 156 at the cashier terminal 150 can show a stock image of the identified electronic device 106, which can allow the clerk 151 to perform a quick visual comparison between the stock image and the electronic device presented by the user 101. For example, if the user 101 presents the electronic device 106 to the clerk 151, but after scanning the label the display 156 shows a stock image of a television, the clerk 151 can terminate the transaction. This feature can preclude one type of abuse in which a user has one device evaluated at the evaluation apparatus 100, and then attempts to provide a different device to the clerk 151 at the cashier terminal 150 for payment. In some embodiments, rather than a stock image of the device, actual images of the device can be used, for example images taken with cameras 116*a-c* while the device was being evaluated at the evaluation apparatus 100. In other embodiments the clerk 151 may electrically connect the device to electrical connectors provided at the cashier terminal 150. Electrical analysis can then be used to determine whether the presented device matches the device evaluated at the evaluation apparatus 100. In some embodiments, the cashier terminal 150 may access a server computer to obtain information associated with the electronic device in order to verify that the device presented at the cashier terminal 150 matches the device evaluated at the evaluation apparatus 100.

If the device identity and/or condition is not confirmed, then in block 422 the clerk may decline payment and return the electronic device to the user. If the device identity and/or condition is confirmed, then in block 424 the user ID is verified. In some embodiments, the user's driver's license or other identification can be scanned at the cashier terminal 150. If the scanned driver's license or other ID matches that scanned previously at the evaluation apparatus 100, then the user's identity may be confirmed. Upon scanning the driver's license, an image of the license including a photo of the individual, can be displayed to the clerk 151 (e.g., via display 156) so that the clerk 151 can determine whether the photo ID matches the user 101. In some embodiments, the user 101 may hand her photo ID to the clerk 151 for confirmation that the photo ID matches the user 101, and that the photo ID matches that scanned previously at the evaluation apparatus 100. In some embodiments, the user 101 may be asked verification questions, for example the user's birthdate as determined from the scanned driver's license at the evaluation apparatus 100. If the user identification is not verified, then in block 422 the clerk 151 declines payment and returns the electronic device to the user. In some embodiments, the clerk 151 may view images of the user 101 obtained at the evaluation apparatus 100 (e.g., via cameras 116*a-c*) to ensure that the individual at the cashier terminal 150 is the same as the user 101 who interacted with the evaluation apparatus 100.

If the user identification is verified, then in block 426 the clerk may dispense compensation to the user. In some embodiments, payment can be made in the form of cash dispensed from the payment dispenser 154 (e.g., a cash drawer). In other embodiments, the compensation can take other forms, for example a redeemable voucher, a coupon, a discount on another device, an e-certificate, a prepaid card, a wired or wireless monetary deposit to an electronic account (e.g., a bank account, credit account, loyalty account, online commerce account, mobile wallet, etc.), Bitcoin, etc. In some embodiments, the cashier terminal can automatically fill out any forms of paperwork necessary for the user to obtain a refund, rebate, or other compensation from the manufacturer or other entity. The completed forms can be provided to the user for submission or may be submitted automatically on behalf of the user.

Once compensation has been provided to the user and the electronic device has been received, the routine 400 continues in block 428 with the clerk storing the electronic device. As noted above, in some embodiments, the bin 160 can be remote from the other components of the cashier terminal 150, for example the bin 160 can be positioned in another location within a store. In some embodiments, the bin 160 can be proximate to the other components, for example a bin beneath the register. In some embodiments, the electronic device 106 can be added, either automatically or manually by the clerk 151, to an inventory database which can be networked to other inventories, manufacturers, resellers, etc. For example, a database may be maintained that includes, for a particular device, the make, model, quantity of such devices in a particular bin and/or in other facilities at remote locations, compensation amount(s) paid to users for such devices, user demographic information, and other information. The database can be periodically updated as new devices are purchased from users and devices are retained in the bin 160. The inventory database can also be used to facilitate recycling of the devices. For example, a retailer may be able to contact an electronics recycler and easily provide information regarding the number and type of devices in the inventory. Pick-up may be scheduled based on volume and/or time from the selected collection agency, and the collection agency would be prepared with a complete list of what inventory to expect. This inventory database additionally provides valuable information regarding which manufacturers and models are being recycled, optionally cross-referenced with user demographic data. Further, the inventory data can be useful to retailers to demonstrate compliance with state and federal regulations regarding electronics recycling and takeback programs.

Figure 5:
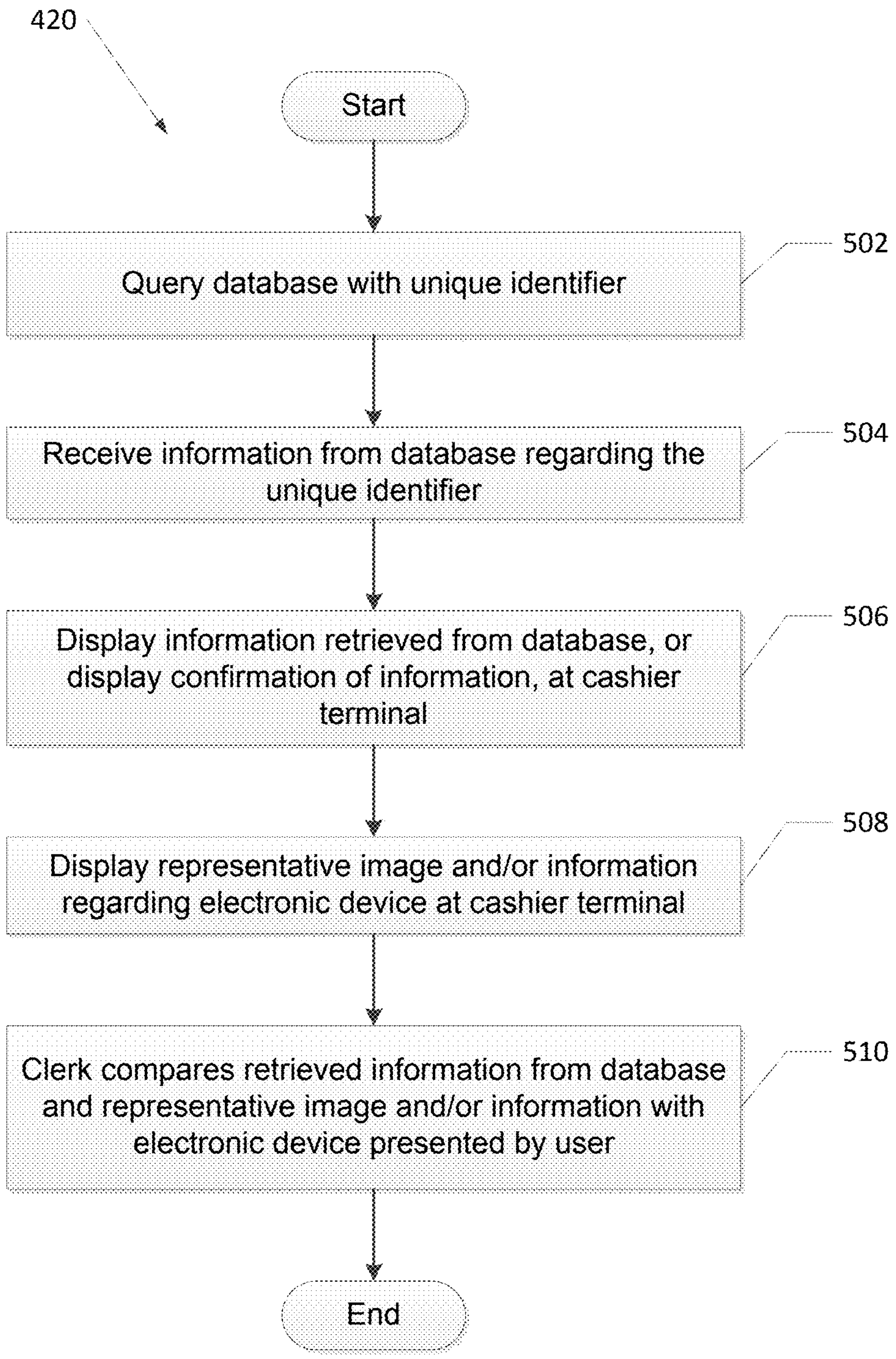
FIG. 5 is a flow diagram illustrating a method of identifying an electronic device in accordance with an embodiment of the present technology.

FIG. 5 illustrates a subroutine corresponding to block 420 of FIG. 4, in which the device identity and/or condition is confirmed. Subroutine 420 begins in block 502 by querying a database (e.g., the database 306 (FIG. 3)) with a unique identifier from the identifying label. As indicated above, an identifying label is printed and dispensed from the evaluation apparatus 100. When the clerk 151 scans the identifying label, a unique identifier (e.g., an alphanumeric string unique to the particular electronic device) is retrieved by the cashier terminal 150. This unique identifier is then used to query the database 306 which includes the information obtained from the evaluation apparatus 100 in connection with the unique identifier. For example, the database 306 can include the information obtained via the electrical and/or visual analysis of the electronic device 106, including one or more of its make model, serial number, IMEI, MEID, color, functional condition, images obtained of the electronic device 106, etc. The database 306 can also include information relating to the user associated with the unique identifier, for example identification obtained (e.g., user driver's license or thumbprint), images obtained of the user, etc. In block 504 information is received from the database 306. The information retrieved can include any subset of the data obtained at the evaluation apparatus 100, in addition or alternatively to retrieving all information obtained at the evaluation apparatus 100. For example, in some embodiments the evaluation apparatus 100 may collect a wide variety of information, but the query of the database 306 may return only the serial number, make, and model of the electronic device 106.

Subroutine 420 continues in block 506 by displaying information retrieved from the database 306 at the cashier terminal. For example, the make and model of the electronic device 106 associated with the unique identifier may be displayed to the clerk 151 at the cashier terminal 150. Additionally, in block 508 a representative image of the electronic device 106 associated with the unique identifier can be displayed at the cashier terminal 150. In some embodiments, the image displayed may be an actual image obtained at the evaluation apparatus 100. In other embodiments, a representative or stock image corresponding to the make and model of the electronic device 106, or of a similar electronic device, can be displayed. For example, if the electronic device 106 associated with the unique identifier is a Lenovo® Thinkpad™ laptop, then a stock image of such a laptop may be displayed to the clerk 151. In block 510, the clerk 151 compares the retrieved information from the database 306 and the representative image with the electronic device presented by the user. If either the retrieved information (e.g., make, model, condition, serial number, etc.) or the representative image does not match electronic device presented at the cashier terminal 150, the transaction can be terminated and the electronic device is returned to the user. In some embodiments the clerk 151 can plug in the electronic device to an electrical connector associated with the cashier terminal 150 for electrical analysis to verify the identity and condition of the device. After electrical analysis, the clerk 151 can be displayed with a "yes" or "no" message via the display 156 of the cashier terminal 150 to indicate whether the electronic device presented by the user at the cashier terminal is the same as the electronic device evaluated at the evaluation apparatus. This comparison can eliminate one type of user fraud in which one device evaluated at the evaluation apparatus 100, and then the user attempts to provide a different device to the clerk 151 at the cashier terminal 150.

As those of ordinary skill in the art will appreciate, the foregoing routine is but one example of a way in which the evaluation apparatus 100 and cashier terminal 150 can be used to recycle or otherwise process consumer electronic devices. Although the foregoing example is described in the context of a laptop, it should be understood that evaluation apparatus 100 and cashier terminal 150 and various embodiments thereof can also be used in a similar manner for recycling virtually any consumer electronic device, such as desktop computers, printers, devices for implemented games, wearable computing devices, mobile phones, MP3 players, tablet computers, PDAs, entertainment or other digital media on CDs, DVDs, Blu-ray, etc.

Figure 6:
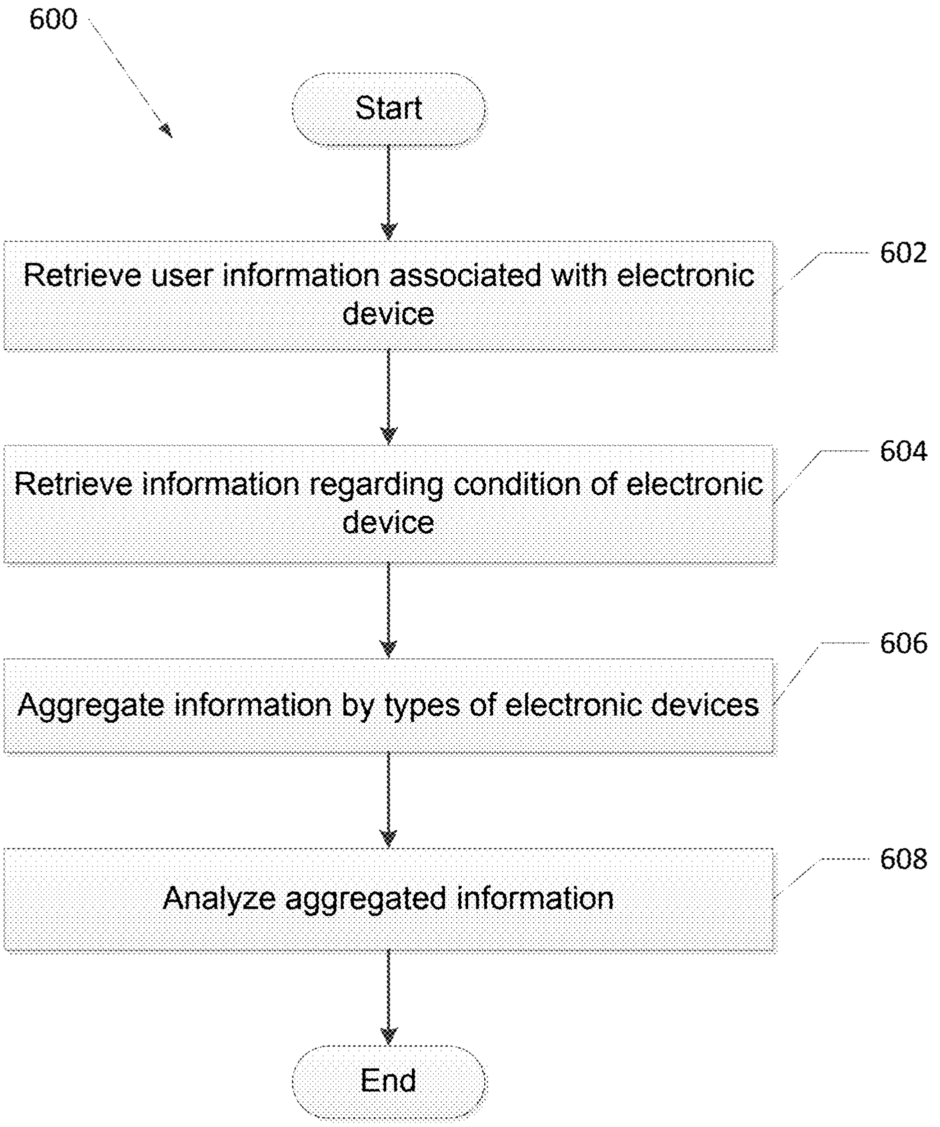
FIG. 6 is a flow diagram illustrating a method for collecting and managing inventory of consumer electronic devices in accordance with an embodiment of the present technology.

FIG. 6 is a flow diagram illustrating a method for collecting and managing inventory of consumer electronic devices in accordance with an embodiment of the present technology. Routine 600 begins in block 602 with retrieving user information associated with the electronic device. Such information can be obtained via user interaction with the evaluation apparatus 100 and/or the cashier terminal 150 as described above. The user may be prompted to provide certain information, or the information may be obtained via biometric scan (e.g., fingerprint scan), ID reader, images obtained of the user, etc. Information regarding the user can include, for example, demographic information (age, gender, location (whether home address obtained from ID or the location of the evaluation apparatus), income, etc.), how long the user has owned the electronic device, reason(s) the owner is returning or recycling the electronic device, identification of replacement or upgrade device to be purchased (if applicable), the retail channel in which the device was purchased and/or returned, etc.

Routine 600 continues in block 602 with retrieving information regarding the condition of the electronic device. For example, the condition of the electronic device can be determined based on the visual and/or electrical analysis performed at the evaluation apparatus, as described above. In some embodiments, the condition of the electronic device can be determined in part based on user input, for example the user may select from a menu of options indicating various conditions of the device (e.g., functional screen, audio, input, keyboard, etc.). In block 606, the retrieved information can be aggregated by types of electronic devices. The information can be retrieved and aggregated from a single retail location (having one or more evaluation apparatuses and one or more cashier terminals), or the information can be retrieved over a network connection from a variety of locations having any number of evaluation apparatuses or cashier terminals. By aggregating the retrieved information by types of electronic devices, valuable patterns or trends may be found by analyzing the aggregated information in block 608. For example, aggregation and analysis of the retrieved data may indicate that a certain brand of laptop computer is being recycled at a faster rate than another brand of laptop computer. In another example, aggregation and analysis may indicate that users offered a particular trade-up promotion accept the offer 75% of the time. The data obtained from aggregation and analysis of the granular data obtained at individual evaluation apparatuses and cashier terminals can be valuable to a wide variety of parties. For example, retailers can usefully determine which promotions are successful and which are not. In another example, manufacturers can determine which models are being recycled or returned more frequently than others, and may also be informed of the reasons associated with the returns. In some embodiments, various forms of aggregated data can be packaged and sold to third parties such as manufacturers, retailers, advertisers, analysts, etc. The data obtained can also be used for efficient processing of recycling and transport of various devices. For example, each retail location can retain the collected electronic devices locally until it is determined, based on aggregated data, when it is most efficient for transport of these electronic devices from the retailers to an electronics recycler.

Those of ordinary skill in the art will appreciate that the routines and other functions and methods described above can be performed by various processing devices, such as the evaluation apparatus processor 200 (FIG. 2), the cashier terminal processor 251 (FIG. 2), the server computer 304 (FIG. 3), or any combination thereof. The processes can be implemented as an application specific integrated circuit (ASIC), by a digital signal processing (DSP) integrated circuit, through conventional programmed logic arrays or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

The evaluation apparatuses 100, cashier terminals 150, electronic device 230, server computers 304, user computers or devices 318, etc. may include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computer devices may include other program modules such as an operating system, one or more application programs (e.g., word processing or spreadsheet applications), and the like. The user computers may include wireless computers, such as mobile phones, personal digital assistants (PDAs), palmtop computers, etc., which communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet may likewise be used herein. The network may have a client-server architecture, in which a computer is dedicated to serving other client computers, or it may have other architectures such as a peer-to-peer, in which one or more computers serve simultaneously as servers and clients. A database or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, message encryption and/or authentication (e.g., using transport layer security (TLS) or secure socket layers (SSL)), password protection schemes, encryption of stored data (e.g., using trusted computing hardware), and the like).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VOIP) phones), dumb terminals, media players, gaming devices, multi-processor systems, microprocessor-based or programmable consumer electronics, set-top boxes, network PCs, mini-computers, mainframe computers, and the like. Indeed, the terms “computer,” “server,” “host,” “host system,” and the like are generally used interchangeably herein, and refer to any of the above devices and systems, as well as any data processor. Input devices may include a touchpad, keyboard and/or a pointing device such as a mouse. Other input devices are possible such as a microphone, joystick, pen, game pad, scanner, digital camera, video camera, and the like. The data storage devices may include any type of computer-readable media that can store data accessible by a computer, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices may include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a propagating signal per se.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system for recycling electronic devices, the system comprising:

a first device, comprising:

at least one electrical connector and/or wireless transceiver configured to connect to an electronic device;

a moveable imaging device configured to capture one or more images of the electronic device at one or more angles; and a first processor in communication with the moveable imaging device, and with the electrical connector and/or with the wireless transceiver, the first processor configured to:

electrically test the electronic device via the electrical connector and/or the wireless transceiver;

facilitate movement of the moveable imaging device to capture the one or more images of the electronic device;

facilitate determining a compensation value for the electronic device, wherein the compensation value is at least partially based on the electrical test and the one or more images of the electronic device; and associate the electronic device with a unique identifier; and a second device, comprising:

a user interface device including a display screen; and a second processor in communication with the user interface device and configured to:

receive the unique identifier;

cause the display screen to display one or more of the captured images of the electronic device after receiving the unique identifier;

obtain verification of an identity of the electronic device based on the unique identifier and the displayed one or more of the captured images; and after obtaining the verification, provide confirmation of the verification of the electronic device to facilitate payment of the compensation value to a user in exchange for the electronic device.

2. The system of claim 1 wherein the moveable imaging device includes a user-operated imaging device operably connected to a housing, and wherein, to facilitate the movement of the moveable imaging device, the first processor is configured to prompt a user to obtain the one or more images of the electronic device.

3. The system of claim 1, further comprising a secure binning area positioned remotely from the first device and/or the second device and configured to receive the electronic device after payment of the compensation value to the user.

4. The system of claim 1 wherein the first device further includes an external imaging device, wherein the first processor is configured to obtain an image of the user via the external imaging device, and wherein the second processor is configured to display the image of the user via the display screen.

5. The system of claim 1 wherein the first device further comprises an identification card reader in communication with the first processor; and wherein the second processor is configured to display, via the display screen, an image of the user obtained from a user identification card read by the identification card reader.

6. The system of claim 1 wherein the electronic device is a mobile phone.

7. An apparatus configured to process electronic devices, the apparatus comprising:

a housing;

a cable connector and/or wireless electrical connector, the cable connector and/or wireless electrical connector configured to connect to an electronic device;

a moveable imaging device configured to capture one or more images of the electronic device at one or more angles; and a processor within the housing and in communication with the moveable imaging device and with the cable connector and/or wireless electrical connector, the processor configured to:

facilitate movement of the moveable imaging device to capture the one or more images of the electronic device;

electrically test the electronic device via the cable connector and/or wireless electrical connector;

facilitate determining a compensation value for the electronic device, wherein the compensation value is at least partially based on the electrical test and the one or more images of the electronic device;

associate the electronic device with a unique identifier; and transmit the unique identifier and one or more of the captured images of the electronic device to a remote processing device for use by a second apparatus configured to display one or more of the captured images to facilitate verification of the identity of the electronic device and further configured to identify the compensation value based at least partially on the unique identifier.

8. The apparatus of claim 7, wherein the moveable imaging device includes a user-operated imaging device operably connected to the housing, and wherein, to facilitate the movement of the moveable imaging device, the processor is configured to prompt a user to obtain the one or more images of the electronic device.

9. The apparatus of claim 7 wherein the moveable imaging device is a first imaging device, wherein the apparatus further comprises a second imaging device, and wherein the processor is further configured to obtain an image of a user via the second imaging device.

10. The apparatus of claim 7 wherein the electronic device is a mobile phone.

11. A method for evaluating an electronic device from a user, the method comprising:

providing a first device, the first device having:

at least one wired and/or wireless electrical connector configured to connect to the electronic device;

a moveable imaging device configured to capture one or more images of the electronic device at one or more angles; and a processor in communication with the moveable imaging device and the wired and/or wireless electrical connector;

at the first device:

receiving information from the electronic device via the wired and/or wireless electrical connector;

capturing the one or more images of the electronic device at the one or more angles via the moveable imaging device; and displaying a price for the electronic device; and at a second device:

receiving the electronic device from the user;

receiving at least one of the one or more images captured by the moveable imaging device;

displaying the at least one of the one or more captured images via a display screen of the second device; and obtaining verification of an identity of the electronic device based on the displayed at least one of the one or more captured images.

12. The method of claim 11, further comprising, at the first device, validating an identification of the user.

13. The method of claim 11, further comprising:
at the first device, obtaining an image of the user; and
at the second device, displaying the image of the user.

14. The method of claim 11, further comprising, at the second device, displaying a sample image of a sample electronic device similar to the electronic device.

15. The method of claim 11 wherein providing the first device comprises providing the first device in a retail establishment, and wherein the second device is located in the retail establishment.

16. The method of claim 11, further comprising, at the second device, dispensing the price to the user based on the verification.

17. The method of claim 11, further comprising electrically evaluating the information received via the wired and/or wireless electrical connector; and determining the price for the electronic device based at least in part on the electrical evaluation.

18. The method of claim 11 wherein the electronic device is a mobile phone.

* * * * *